(12) United States Patent
Rogers et al.

(10) Patent No.: US 10,600,066 B2
(45) Date of Patent: Mar. 24, 2020

(54) SYSTEMS AND METHODS FOR VIRTUAL ENVIRONMENT CONSTRUCTION FOR BEHAVIORAL RESEARCH

(71) Applicant: 20/20 IP, LLC, Nashville, TN (US)

(72) Inventors: Isaac David Rogers, Nashville, TN (US); James Edward Bryson, Nashville, TN (US); Kathryn Kersey Harlan, Nashville, TN (US)

(73) Assignee: 20/20 IP, LLC, Nashville, TN (US)

( * ) Notice: Subject to any disclaimer, the term of this patent is extended or adjusted under 35 U.S.C. 154(b) by 0 days.

(21) Appl. No.: 16/512,149

(22) Filed: Jul. 15, 2019

(65) Prior Publication Data

US 2019/0354999 A1     Nov. 21, 2019

Related U.S. Application Data

(63) Continuation of application No. 14/274,351, filed on May 9, 2014, now Pat. No. 10,354,261, which is a
(Continued)

(51) Int. Cl.
*G06Q 30/02*      (2012.01)
*G06K 9/00*      (2006.01)

(52) U.S. Cl.
CPC ..... *G06Q 30/0201* (2013.01); *G06K 9/00604* (2013.01); *G06K 9/00617* (2013.01); *A63F 2300/8082* (2013.01)

(58) Field of Classification Search
CPC .. A61B 5/163; B60R 25/255; G02B 27/0093; H04L 67/38; H04L 29/08126; H04L 29/06034; B60K 2370/177; G06F 3/011; G05D 1/0044; G05B 2219/36432; G05B 2219/32355; A63F 2300/8082; G06Q 30/00; G06Q 30/0201; G06K 9/00335; G06K 9/00617; G06K 9/00604

See application file for complete search history.

(56) References Cited

U.S. PATENT DOCUMENTS 5,583,795 A * 12/1996 Smyth ................. A61B 3/0025
359/630
5,914,720 A * 6/1999 Maples .................. G06F 3/011
345/156

(Continued)

FOREIGN PATENT DOCUMENTS

WO    WO-2008081413 A1 *   7/2008  ............. G06Q 30/02
WO    WO-2014088906 A1 *   6/2014  ......... G06Q 30/0269

*Primary Examiner* — Tyler W Knox
(74) *Attorney, Agent, or Firm* — Frost Brown Todd LLC

(57) ABSTRACT

Exemplary embodiments provide methods, mediums, and systems for behavioral research. In some embodiments, a simulated environment may be created. The simulated environment may be displayed to a user on a proprietary display device which utilizes a proprietary data format for storing the simulated environment. Multiple different types of proprietary devices may be supported by providing a hardware agnostic canvas and translation logic. The hardware agnostic canvas may be stored in a neutral format that is not specific to a proprietary display device. The translation logic may translate the hardware agnostic canvas into a format that is interpretably by a proprietary display device, and may translate data gathered from the proprietary display device into a hardware neutral format for further analysis.

20 Claims, 18 Drawing Sheets

Related U.S. Application Data continuation of application No. 14/254,643, filed on Apr. 16, 2014, now abandoned.

(56) References Cited

U.S. PATENT DOCUMENTS

| | | | | |
|---|---|---|---|---|
| 6,106,119 | A * | 8/2000 | Edwards | A61B 3/0025 351/209 |
| 6,474,159 | B1 * | 11/2002 | Foxlin | G01C 21/12 73/488 |
| 6,577,329 | B1 * | 6/2003 | Flickner | G06F 3/013 715/774 |
| 8,260,690 | B2 * | 9/2012 | Eivaz | G06F 3/011 705/26.1 |
| 8,392,254 | B2 * | 3/2013 | Pradeep | G06Q 30/02 705/14.42 |
| 8,401,248 | B1 * | 3/2013 | Moon | G06Q 30/0242 382/103 |
| 8,412,656 | B1 * | 4/2013 | Baboo | G06Q 30/0201 706/20 |
| 8,434,868 | B2 * | 5/2013 | Sato | A61B 5/0496 351/200 |
| 8,449,116 | B2 * | 5/2013 | Sato | A61B 5/0496 351/209 |
| 8,487,838 | B2 * | 7/2013 | Lewis | G06F 3/013 345/8 |
| 8,510,166 | B2 * | 8/2013 | Neven | A61B 5/163 705/14.68 |
| 9,400,993 | B2 * | 7/2016 | Edwards | G06F 3/0488 |
| 9,974,612 | B2 * | 5/2018 | Pinter | A61B 5/0008 |
| 2002/0059095 | A1 * | 5/2002 | Cook | G06Q 10/06311 705/7.32 |
| 2005/0211768 | A1 * | 9/2005 | Stillman | G07F 11/00 235/381 |
| 2006/0064342 | A1 * | 3/2006 | Frengut | G06Q 10/00 705/7.32 |
| 2006/0112031 | A1 * | 5/2006 | Ma | G06K 9/3233 706/16 |
| 2007/0016488 | A1 * | 1/2007 | Ulenas | G06Q 30/02 705/14.49 |
| 2007/0066916 | A1 * | 3/2007 | Lemos | A61B 3/113 600/558 |
| 2007/0179867 | A1 * | 8/2007 | Glazer | G06Q 30/0253 705/26.43 |
| 2007/0265507 | A1 * | 11/2007 | de Lemos | A61B 3/113 600/300 |
| 2008/0065468 | A1 * | 3/2008 | Berg | G06Q 30/02 705/7.32 |
| 2008/0163054 | A1 * | 7/2008 | Pieper | G06Q 30/00 715/706 |
| 2008/0172680 | A1 * | 7/2008 | Gyorfi | A63F 13/12 719/318 |
| 2009/0187461 | A1 * | 7/2009 | Brignull | G06Q 30/02 705/7.33 |
| 2010/0004977 | A1 * | 1/2010 | Marci | A61B 5/16 705/7.32 |
| 2010/0010366 | A1 * | 1/2010 | Silberstein | A61B 3/113 600/544 |
| 2010/0033333 | A1 * | 2/2010 | Victor | A61B 5/7264 340/576 |
| 2010/0058208 | A1 * | 3/2010 | Finn | G06Q 30/00 715/764 |
| 2010/0205043 | A1 * | 8/2010 | Edwards | G06Q 30/0643 705/7.29 |
| 2011/0010266 | A1 * | 1/2011 | Edwards | G06Q 30/06 705/26.8 |
| 2011/0085700 | A1 * | 4/2011 | Lee | G06Q 30/02 382/103 |
| 2011/0161163 | A1 * | 6/2011 | Carlson | G06Q 30/02 705/14.44 |
| 2011/0256520 | A1 * | 10/2011 | Siefert | G09B 5/10 434/322 |
| 2011/0279666 | A1 * | 11/2011 | Strombom | A61B 3/113 348/78 |
| 2012/0105486 | A1 * | 5/2012 | Lankford | G06F 3/013 345/661 |
| 2013/0022947 | A1 * | 1/2013 | Muniz Simas | G09B 19/00 434/236 |
| 2013/0022950 | A1 * | 1/2013 | Muniz Simas | G09B 7/02 434/238 |
| 2013/0035989 | A1 * | 2/2013 | Brown | G06Q 30/0201 705/7.33 |
| 2013/0121591 | A1 * | 5/2013 | Hill | G06K 9/46 382/195 |
| 2013/0127980 | A1 * | 5/2013 | Haddick | G06F 3/013 348/14.08 |
| 2013/0215116 | A1 * | 8/2013 | Siddique | G06Q 30/0643 345/420 |
| 2013/0293530 | A1 * | 11/2013 | Perez | G06K 9/00671 345/418 |
| 2013/0293844 | A1 * | 11/2013 | Gross | A61B 5/0013 351/209 |
| 2013/0308099 | A1 * | 11/2013 | Stack | A61B 3/113 351/209 |
| 2013/0321265 | A1 * | 12/2013 | Bychkov | G06F 3/013 345/156 |
| 2013/0325546 | A1 * | 12/2013 | Sorensen | G06Q 30/0201 705/7.29 |
| 2014/0055846 | A1 * | 2/2014 | Wheeler | A61B 3/113 359/350 |
| 2014/0114742 | A1 * | 4/2014 | Lamontagne | G06Q 30/0242 705/14.41 |
| 2014/0152792 | A1 * | 6/2014 | Krueger | A61M 21/00 348/78 |
| 2014/0164056 | A1 * | 6/2014 | Johnson | G06Q 30/0201 705/7.29 |
| 2014/0277735 | A1 * | 9/2014 | Breazeal | B25J 9/0003 700/259 |
| 2014/0289834 | A1 * | 9/2014 | Lindemann | G06Q 20/42 726/7 |
| 2014/0315635 | A1 * | 10/2014 | Brown | A63F 13/12 463/31 |
| 2014/0320397 | A1 * | 10/2014 | Hennessey | A61B 3/113 345/156 |
| 2014/0340639 | A1 * | 11/2014 | Rust | A61B 3/113 351/209 |
| 2014/0344012 | A1 * | 11/2014 | Kamhi | G06F 3/013 705/7.29 |
| 2014/0361996 | A1 * | 12/2014 | Eden | G06F 3/013 345/173 |
| 2014/0365333 | A1 * | 12/2014 | Hurewitz | G06Q 30/0643 705/26.9 |
| 2015/0025936 | A1 * | 1/2015 | Garel | G06Q 30/0269 705/7.29 |
| 2015/0193979 | A1 * | 7/2015 | Grek | G06F 1/1694 345/633 |
| 2015/0268821 | A1 * | 9/2015 | Ramsby | G06F 3/013 715/765 |
| 2015/0301597 | A1 * | 10/2015 | Rogers | G06K 9/00335 345/156 |
| 2015/0302426 | A1 * | 10/2015 | Rogers | G06K 9/00617 705/7.29 |
| 2016/0027024 | A1 * | 1/2016 | Minevski | G06Q 30/0201 705/7.29 |

\* cited by examiner

Database of Environmental Objects

| ObjectID | Environment Object Type | Description | Media Object Type | Remote Server Location | Gaze Trigger ID | Object Location |
|---|---|---|---|---|---|---|
| 5165 | Product Image | Soap Container Test Item 2 | 3d | /products/3d/ | 849 | X: 484 Y: 889 Z: 990 |
| 5643 | Product Image | Soap Container Test Item 3 | 3d | /products/3d/ | 877 | X: 484 Y: 889 Z: 991 |
| 7894 | Environment Floor | White store flooring tiles sample 3a | 2d | /envirn/2d/ | None | X: 484 Y: 889 Z: 992 |
| 7846 | Environment Ceiling | White store ceiling tiles sample 5b | 2d | /envirn/2d/ | None | X: 484 Y: 889 Z: 993 |
| 21113 | Static Object | Standard 8ft white retail shelf, 5 racks | 3d | /envirn/3d/ | None | X: 484 Y: 889 Z: 994 |
| 21564 | Static Object | 7ft beverage cooler model 58a | 3d | /envirn/3d/ | None | X: 484 Y: 889 Z: 995 |
| 21456 | Static Object | Store display banner "Bakery" v 332 | 2d | /envirn/2d | None | X: 484 Y: 889 Z: 996 |
| 20486 | Audio Object | Captured audio, retailer self checkout | Audio | /envirn/audio/ | None | X: 484 Y: 889 Z: 997 |
| 20458 | Audio Object | Captured audio, retailer standard checkout | Audio | /envirn/audio/ | None | X: 484 Y: 889 Z: 998 |
| 3895 | Motion Object | Animated TV display, endcap video, standard file 5949 | 3d | /envirn/3d/ | 289 | X: 484 Y: 889 Z: 999 |
| 3878 | Motion Object | Moving signage, checkout lanes Kroger 5983 | 3d | /envirn/3d/ | None | X: 484 Y: 889 Z: 1000 |
| 1124 | Participant Object | Random shopper avatar, male caucasian v. 947 | 3d | /avatars/ | None | X: 484 Y: 889 Z: 1001 |
| 1129 | Participant Object | Random shopper avatar, female caucasian v. 212 | 3d | /avatars/ | None | X: 484 Y: 889 Z: 1002 |

Hardware Agnostic Canvas 22

Translation Mapping Library for Interface Hardware

| VR Hardware ID | Label | Version | Max Resolution | Latency | Audio Capable | Participants Mics | Head Position Type | Accuracy | Local Runtime Version | Brightness | Horizontal Range | Vertical Range |
|---|---|---|---|---|---|---|---|---|---|---|---|---|
| 1 | VR headset X | 1 | 1024 | 6ms | Y | Y | Accelerometer | 10mm | 2.2 | 10 | 310 | 90 |
| 2 | VR headset Y | 1 | 2048 | 2ms | N | Y | IR | 3mm | 2.3 | 9 | 324 | 80 |
| 3 | VR headset Z | 3.2 | 4096 | 1ms | Y | Y | Accelerometer | 3mm | 2.8 | 10 | 355 | 110 |

Translation Mapping Information 142

Fig. 7

SYSTEMS AND METHODS FOR VIRTUAL ENVIRONMENT CONSTRUCTION FOR BEHAVIORAL RESEARCH

RELATED APPLICATIONS

The present application is a continuation of, and claims priority to, U.S. patent application Ser. No. 14/274,351, entitled "Systems and Methods for Virtual Environment Construction for Behavioral Research" and filed on May 9, 2014, now U.S. Pat. No. 10,354,261; which is a continuation of U.S. patent application Ser. No. 14/254,643, entitled "Systems and Methods for Multi-User Behavioral Research" and filed on Apr. 16, 2014, now abandoned. The contents of the aforementioned applications are incorporated herein by reference.

BACKGROUND

Behavioral research, and particularly behavioral research relating to consumers' product preferences, may be a time consuming and expensive process. Even when behavioral research is conducted with a significant investment of time and money, the results of the research may not be wholly accurate or representative of consumers' true views.

In some behavioral research scenarios, focus groups of one or more participants are brought together in a common location and presented with products for evaluation. Participants may be brought to a special facility expressly designed for focus group testing (e.g., a facility with special conference rooms that allow the participants to be observed or recorded), which may add to the cost of conducting a focus group. Furthermore, costs may be driven up by the need to produce non-production product mockups or prototypes for the focus group, or simulated two-dimensional models to be displayed on a computer.

Moreover, traditional focus group testing may not yield entirely accurate or satisfactory results. In a focus group, products may be viewed in isolation and/or out of a purchasing context. This may make it difficult to draw conclusions about how a consumer would interact with the product in a retail establishment or online, where the user would be confronted with multiple products and different environmental conditions.

Still further, traditional behavioral research methods may rely on self-reporting by the participants, which may be inaccurate or easily manipulated. For example, consider a participant who is presented with several designs for product packaging and asked which one he or she prefers. The participant may favor a first product design, but may report a different choice. For instance, in a group setting the participant may feel social pressure to select a popular option preferred by the rest of the group.

The present application is addressed to these and other issues that may constrain conventional behavioral research and consumer preference testing.

SUMMARY

Exemplary embodiments described herein relate to methods, mediums, and systems for performing behavioral research in a simulated environment, such as a virtual reality environment. By moving behavioral research into a simulated environment, the research can be conducted either in person or remotely, allowing for increased flexibility and cost savings. Furthermore, participants may interact with a product in a more natural way (e.g., by observing the product side-by-side with other products in a simulated retail establishment).

Exemplary embodiments may be configured to record the participant's observational data (e.g., the location where the observer is directing their gaze, the amount of time spent looking at a particular product, and whether the participant revisited the product after moving on to another product). Thus, a researcher's reliance on participant self-reporting may be reduced.

In order to conduct the behavioral research, a centralized server that hosts the environment and/or research may be provided. The centralized server may be located at a central facility (e.g., a facility associated with the researcher), at a remote location, or may be distributed (e.g., using cloud-based resources). Different types of users having different roles may connect to the server. In order to facilitate the different roles of the different types of users, the server may expose multiple interfaces that provide different capabilities.

For example, a participant in a research project may be placed in the simulated environment and may control their own location (and the location of their gaze) within the environment. A participant interface may therefore be provided, where the participant interface allows the participant to change positions in the environment and records participant observational data.

Another type of user may include a moderator responsible for running the research project. The moderator may communicate with the participants, observe what the participants are looking at, may manually move the participants to specified locations in the environment, and may trigger questions about products in the environment that appear on the user's display. A user connecting to the server through a moderator interface may be provided with these capabilities.

A third type of user may include a client interested in the outcome of the behavioral research. For example, the client may be a product designer whose product is being reviewed by the participants in the simulated environment. A client interface may permit the client to observe what the participants are observing, and may potentially communicate with the moderator.

However, it may be undesirable to allow the client to affect the participant's observations, and hence the client interface may be limited to observation and communication with the moderator.

Thus, the central server may build and/or maintain a simulated environment, and provide functionality for interacting with the simulated environment on behalf of multiple different types of users in such a way that meaningful behavioral research may be conducted.

For example, according to a first embodiment, a system for monitoring behaviors of a participant by a moderator and a client may be provided. The system may include a non-transitory storage medium storing logic, and a processor for executing the logic.

The logic may include logic for implementing a participant interface that sends and receives instructions for simulating an environment and observing the simulated environment. The participant interface logic may include demographic rules that cause the environment to be simulated in a different manner depending on demographics the participant. The participant interface logic may also include logic for changing a position of a participant avatar in the simulated environment, and/or logic for changing a location of a participant's gaze in the simulated environment.

The logic may further include logic for implementing a moderator interface that sends and receives instructions for simulating the environment and manipulating the simulated environment. The moderator interface logic may include logic for moving the participant to a specified location in the simulated environment. The moderator interface logic may further include logic for manually triggering a survey question.

The logic may further include logic for implementing a client interface that sends and receives instructions for viewing the simulated environment from the perspective of the participant. In some embodiment, the client interface logic may limit the actions of the client in the simulated environment to viewing the simulated environment from the perspective of the participant.

The processor may further be programmed to maintain the simulated environment, receive observational data about the simulated environment from the participant interface logic, and store the observational data in the storage medium.

For example, in some embodiments the processor may calculate one or more viewing windows for the participant's gaze. The processor may calculate scores for each of the viewing windows, the calculated scores representing an amount of attention given to an object in the viewing windows. Alternatively or in addition, the processor may identify that the location of the participant's gaze encompasses a predefined trigger point, retrieve a survey question associated with the predefined trigger point, and transmit an instruction to the visual display device to display the retrieved survey question.

According to some exemplary embodiments, an interface may be provided to connect the system to a visual display device for displaying the simulated environment. The visual display device may be, for example, a virtual reality headset or a browser.

According to some exemplary embodiments, the storage medium may store one or more hardware agnostic canvases that represent the simulated environment in a manner that is not specific to the visual display device, and the processor may translate the one or more hardware agnostic canvases into a format that is interpretable by the visual display device.

Further exemplary embodiments provide methods for monitoring behaviors of a participant by a moderator and a client. The methods may include simulating an environment comprising an object of study. Instructions may be transmitted to a participant visual display device, where the instructions include instructions for displaying a participant perspective of the simulated environment on the participant visual display device.

Participant location data describing a change in a position or a gaze location of the participant in the simulated environment may be received and analyzed. A score may be calculated based on the participant location data, where the score represents an amount of attention paid by the participant to the object of study in the simulated environment. The score may be stored in a non-transitory storage medium.

In some embodiments, second instructions may be transmitted to a client visual display device. The second instructions may include instructions for displaying the participant perspective of the simulated environment on the client visual display device.

Further embodiments provide a non-transitory electronic device readable medium storing instructions that, when executed, cause a processor to perform a method. The method may include connecting to a participant interface of an environmental server responsible for maintaining a simulated environment comprising an object of study. The environmental server may maintain a plurality of different types of interfaces, each type of interface corresponding to a different type of user interacting with the simulated environment and providing different capabilities for the different types of users.

Information about the simulated environment may be received from the participant interface, and the simulated environment may be rendered for a participant based on the received information. Participant location data describing a change in a position or a gaze location of the participant in the simulated environment may be transmitted to the environmental server using the participant interface.

Updated information about the simulated environment may be received, and the rendered simulated environment may be updated based on the updated information.

A manipulation of the simulated environment may also be received, where the manipulation comes from an instruction transmitted through a moderator interface of the environmental server. The manipulation may be executed in the simulated environment. For example, the manipulation may include an instruction that the participant be moved to a specified location in the simulated environment, and executing the manipulation may include moving the participant to the specified location.

Using the exemplary embodiments described herein, behavioral research can be carried out in an efficient, inexpensive, and reliable manner. These and other features of exemplary embodiments will be apparent from the detailed description below, and the accompanying Figures.

BRIEF DESCRIPTION OF THE DRAWINGS

FIG. 7 depicts a hardware-agnostic canvas suitable for use in exemplary embodiments

DETAILED DESCRIPTION

Figure 1:
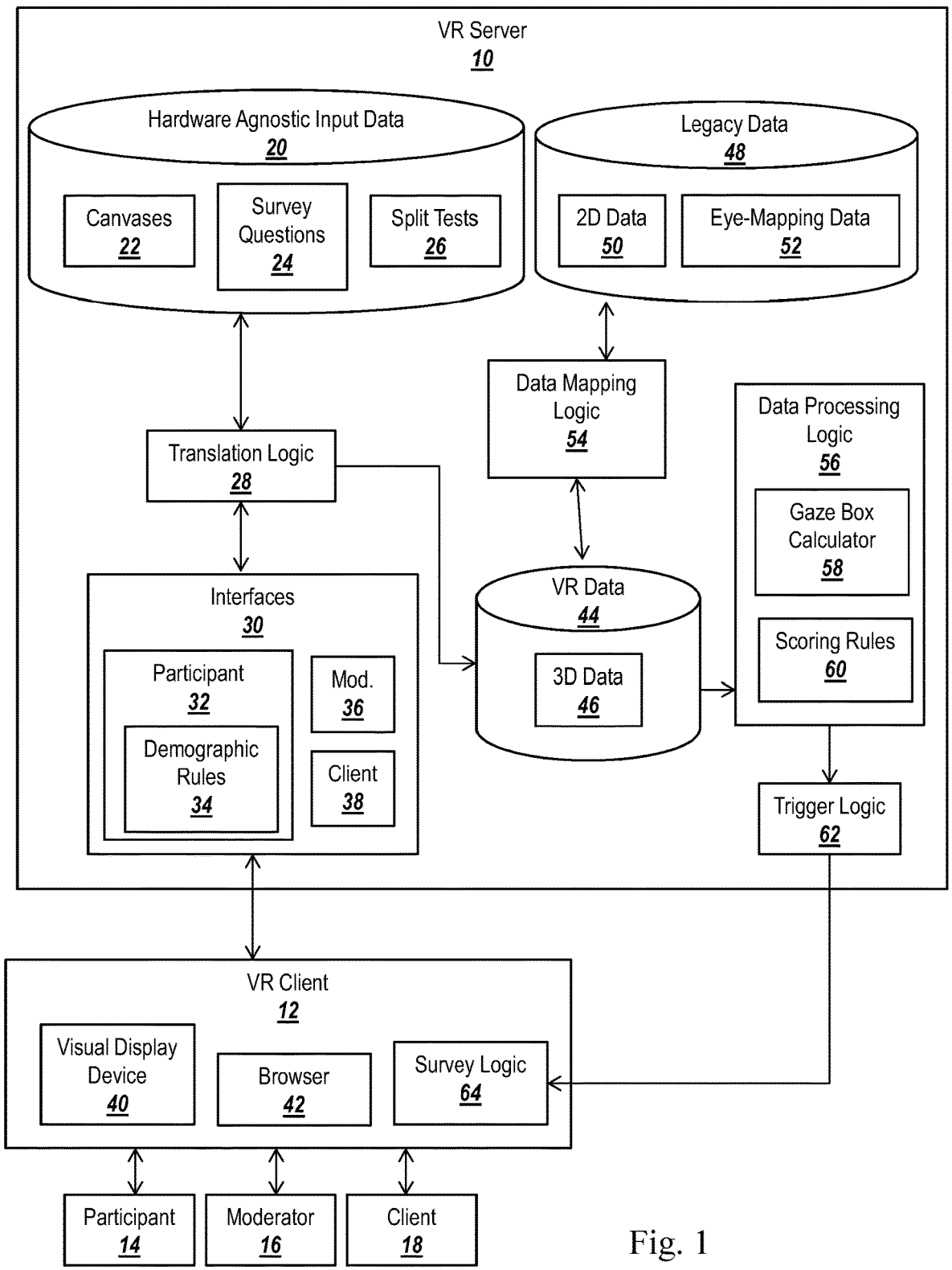
FIG. 1 depicts an exemplary system for hosting, managing, and displaying a simulated environment according to an exemplary embodiment.

Exemplary embodiments relate to methods, mediums, and systems for conducting behavioral research in a simulated environment. One or more devices may work together to maintain the simulated environment and analyze data indicative of where a user is placing their attention within the environment. In order to conduct the research, multiple different types of users, including participants, moderators, and clients, may interact with the simulated environment. Exemplary embodiments provide different interfaces having different capabilities for each of the different types of users.

As used herein, a participant refers to a person whose behavior is being monitored or observed in a behavioral research project. The participant may be placed into a simulated environment and allowed to freely or semi-freely interact with the environment, changing the location of their gaze within the environment. The participant's gaze location may be analyzed to determine which objects in the simulated environment are more likely to capture a consumer's attention.

The simulated environment and the participant(s)' interactions with the environment may be curated by a moderator. As used herein, a "moderator" refers to an entity or entities that interactively guide the participant's experience in the simulated environment. This interaction may include audio, visual and/or haptic cues. The interaction may involve directing the participant's attention to particular features within the simulated environment, posing questions to the participant, and manually moving the participant within the simulated environment.

A client may have an interest in the participant's views of the objects in the simulated environment. For example, the client may be a product designer whose products are being tested in the simulated environment. However, it may be undesirable to allow the client to directly interact with the participant, as this may affect the impartiality of the participant's observations. Accordingly, in some embodiments a client is limited to passive observation: e.g., viewing the simulated environment from the perspective of the participant. In other embodiments, the client may be permitted limited interaction with the participant, such as by triggering survey questions.

Participants, moderators, and users are collectively referred to herein as users. One or more different types of interfaces may be defined for allowing the different types of users to connect to, and interact with, the simulated environment. Each of the different types of interfaces may support a different type of user by providing the above-described functionality for a user connecting to the interface. For example, a participant interface may allow a user connecting through it to move about the simulated environment, change the location of their gaze, and receive and answer survey questions about objects in the environment. The participant interface may lack the ability to (for example) manually trigger survey questions or change the location of other participants, which may be capabilities reserved for the moderator interface.

An overview of the system for providing the simulated environment will first be described.

System Overview

FIG. 1 depicts an exemplary system for supporting the different types of users in a simulated environment.

The system may include a virtual reality (VR) server 10 and a VR client 12. The VR server 10 may be responsible for maintaining a simulated environment and coordinating the use of the simulated environment among multiple users. The users, which may include a participant 14, a moderator 16, and a client 18, may interact with the simulated environment through one or more VR clients 12.

The simulated environment may be displayed on a visual display device 40, such as a VR headset. Visual display devices 40 come in multiple different types, some of which may use proprietary or custom display formats. Examples of visual display devices 40 include, but are not limited to, the OCULUS RIFT headset of FACEBOOK, Inc. of Menlo Park, Calif. and the Project Morpheus headset produced by SONY Corp. of Tokyo, Japan.

Because each of the different types of VR headsets may use unique display formats, it may be desirable to store information used to create the simulated environment in a hardware agnostic manner. Thus, the VR server 10 may store hardware agnostic input data 20. In this regards, "hardware agnostic" refers to a neutral format that is not specific to, or usable by, a single particular type of device. Rather, the hardware agnostic input data 20 is saved in a format that is readily translated into a format that can be understood by a particular hardware device. In other embodiments, input data used to create the simulated environment may be stored in an proprietary or hardware non-agnostic format, and then translated into other formats as necessary (potentially by translating the input data from a first hardware-specific format into an intermediate hardware agnostic format, and then from the hardware agnostic format into a second hardware-specific format).

The hardware agnostic input data 20 may include hardware agnostic canvases 22 that represent the simulated environment and the objects in it. For example, the canvases 22 may represent databases of stored objects and locations for the stored objects, which are rendered in the simulated environment. The hardware agnostic canvases may define a location for the objects in a 3D or 2D coordinate system, which can be used by the VR client 12 to render the objects at an appropriate location with respect to the user's position in the simulated environment. An example of a hardware agnostic canvas is depicted in FIG. 7 and discussed in more detail below.

The hardware agnostic input data 20 may further include survey questions 24. The survey questions 24 may include questions that are triggered, either manually (e.g., by a moderator) or when a certain set of conditions with respect to the user, the environment, and/or an object in the environment are met. For example, the survey questions 24 may define a trigger location at which the question may be triggered.

The survey questions 24 may further define an attention score required before the questions are triggered. As will be described in more detail below, the VR server 10 may calculate a score for one or more objects or locations in the simulated environment based on how much attention a participant gives to the object or location. For example, a participant that stared at an object for ten seconds might yield a higher score for the object than a participant who glances at the object in passing. The score may be accumulated by increasing amounts if the participant re-visits an object (e.g., the participant glances at the object, moves away from the object for a certain period of time, and then returns to the object).

By using the attention score to trigger questions, different questions can be posed to a participant depending on how much attention the participant has given to the object. For instance, exemplary survey questions 24 are shown in Table 1 below. In Table 1, each of the four questions is triggered at the same location. However, depending on how much attention score the user has accumulated for the object at that location, different questions may be posed.

TABLE 1

Exemplary Survey Questions

| Question ID | Question | Responses | Trigger Location | Score Required on Location |
|---|---|---|---|---|
| 1 | What do you think of this package? | Voice audio response (max 30 sec) | (21.8, 77.2, 99.2) | 2300 |
| 2 | Did you notice the price? | Yes/No | (21.8, 77.2, 99.2) | 1000 |
| 3 | Have you seen this Product before? | Yes/No/ Don't Recall | (21.8, 77.2, 99.2) | 5000 |
| 4 | What was the name of this product? | Open Text | (21.8, 77.2, 99.2) | 2000 |

In addition to the canvases 22 and the survey questions 24, the hardware agnostic input data 20 may include split tests 26, which define variants of a product that may be tested in the simulated environment. For example, a split test 26 may define two different types of packaging that may be applied to a product. The different types of packaging may be displayed randomly to different participants, or may be displayed based on participant demographics (e.g., men view a product in green packaging, whereas women view a product in yellow packaging).

The hardware agnostic input data 20 may be translated into a format understandable by the VR client 12 by translation logic 28. Among other functionality, the translation logic may accept the object definitions in the canvases 22, which are defined using a coordinate system, and provide instructions for the VR client that allows the VR client to accurately render the objects. The translation logic may account for (among other things) the resolution, color capabilities, and size of the visual display device 40 in determining how the object should be rendered in the simulated environment on that particular visual display device 40. An exemplary method for translating the hardware agnostic input data 20, which may be implemented by the translation logic 28, is described in more detail with respect to FIG. 9.

The translation logic 28 may also work in reverse. That is, the translation logic 28 may accept data (2D or 3D data) returned from the VR client 12 and translate the data into a hardware agnostic format for processing. For instance, the VR client 12 may provide information as to where the display was pointing at a particular moment in time. The translation logic may accept this information and determine the participant's location and/or the direction in which the participant was looking with respect to the hardware-agnostic coordinate system. This information may be used for data processing and aggregation across multiple users (potentially using multiple different types of visual display devices 40).

Once the hardware agnostic input data 20 is translated by the translation logic 28, it may be used to generate a simulated environment. Because each of the participant(s) 14, the moderator(s) 16, and the client(s) 18 interact with the simulated environment in different ways, different types of interfaces 30 into the VR server may be provided. By accessing a particular type of interface 30, the user defines what type of user they are and what kinds of capabilities they will have to interact with the environment and other users in the environment.

For example, a participant interface 32 may sends and receives instructions for simulating an environment and observing the simulated environment. The participant interface 32 may allow a participant 14 to change their position (e.g., the position of a participant avatar) in the simulated environment. The participant interface 32 may further allow the participant 14 to change a location of the participant's 14 gaze in the simulated environment.

The participant interface 32 may include demographic rules 34 that cause the environment to be simulated in a different manner depending on demographic attributes of the participant 14. For example, different products may be displayed to participants 14 having different demographic attributes, or the participant 14 could be placed in an entirely different simulated environment depending on their demographic attributes.

The interfaces 30 may further include a moderator interface 36 that sends and receives instructions for simulating the environment and manipulating the simulated environment. The moderator interface 36 may allow the moderator 16 to interact with the simulated environment using their own avatar (e.g., the moderator 16 may move through the simulated environment in the same manner as a participant 14), or may allow the moderator 16 to view the simulated environment from the perspective of one of the participants 14 (e.g., viewing the environment through the eyes of the participant). The moderator interface 30 may include a switch or selection mechanism that allows the moderator 16 to switch the moderator's view from a moderator avatar to a participant's perspective. The switch or selection mechanism may be activated during a research session in order to allow for real-time switching between perspectives.

The moderator interface 36 may allow a moderator 16 to move a selected participant 14 to a specified location in the simulated environment. The moderator interface 36 may further include logic for manually triggering a survey question.

The interfaces 30 may further include a client interface 38 that sends and receives instructions for viewing the simulated environment from the perspective of the participant 14. In some embodiments, the client interface 38 may limit the actions of the client 18 in the simulated environment to viewing the simulated environment from the perspective of the participant 14. In others, the client 18 may be provided with some limited ability to interact with the participant 14 (e.g., by triggering survey questions 24).

The interfaces 30 may be implemented in a number of ways. For example, the VR server 10 may expose different ports through which different types of users may connect over a network. A user connecting through port 1 may be identified as a participant 14, a user connecting through port 2 may be identified as a moderator 16, and a user connecting through port 3 may be identified as a client 18.

Alternatively or in addition, the interfaces 30 may define different packet formats (e.g., a first format for a participant 14, a second format for a moderator 16, and a third format for a client 18). When a packet is received by the interfaces 30, the interfaces 30 may identify the packet format, determine what type of user is associated with the format, and provide appropriate functionality.

Alternatively or in addition, instructions from the VR client 12 may be tagged with different flags depending on what type of user is interacting with the VR client 12. The interfaces 30 may recognize the flags and provide different types of functionality according to what type of user is associated with each flag.

Still further, the interfaces 30 may be programmed with a library of users and a type associated with each user. When instructions or information is received from a particular user (e.g., tagged by a user ID), the interfaces 30 may consult the library and determine what functionality the user is able to implement.

Providing the different types of functionality to different types of users may be achieved in several ways. The different types of interfaces 30 may interpret commands differently depending on what type of interface 30 the command is received on. Furthermore, the interfaces 30 may instruct the visual display device 40 to provide different displays, graphical interfaces, and or menu options depending on which type of interface the user connects through.

For example, a user connecting through the participant interface 32 may be provided with the functionality to move their avatar through the simulated environment. If the user is interacting with the environment using (e.g.) a joystick, then commands from the joystick may be interpreted as a command to move an avatar present in the simulated environment according to the joystick commands. On the other hand, a moderator 16 may or may not be in control of an avatar. If the moderator 16 is not controlling an avatar, and is instead observing the simulated environment from a camera perspective or "bird's eye view," then the joystick commands received through the moderator interface 36 may be interpreted as a command to move the moderator's 16 camera. Still further, joystick commands from a client 18 may be interpreted as an instruction to change the participant 14 whose perspective the client 18 is currently observing.

In another example, a participant 14 may be presented with a view of the simulated environment through the visual display device 40. The view may include a window for presenting survey questions 24, when the survey questions 24 are triggered. The participant interface 32 may transmit instructions for displaying such an interface on the participant's 14 visual display device 40.

In contrast, the moderator 14 may be provided with a display of the simulated environment, but may also be provided with administrative menu options. The menu options might include, for example, a command to move a user to a specified location, an "enable communication" command that allows the moderator to transmit audio signals to the VR client 12 of a participant 14, a command to manually trigger a survey question 24, etc.

Similarly, the client 18 may be provided with interface options for changing perspective to a different participant 14, triggering survey questions, etc.

Thus, the interfaces 30 may include instructions for rendering different types of displays and different types of display options depending on what kind of user has accessed the interface.

The simulated environment as viewed through the interfaces 30 may be displayed on the visual display device 40 and/or a browser 42 of the VR client 12. The browser 42 may be, for example, a two-dimensional representation of the simulated environment (e.g., a representation viewed on a web browser or a 2D gaming console).

As the participant 14 interacts with the simulated environment through the VR client 12, the VR client 12 may generate VR data 44 describing the participant's 14 interaction with the environment. In one exemplary embodiment, the VR client 12 may collect data regarding the location of the participant's 14 avatar in the simulated environment, and the location at which the participant 14 is directing their gaze.

The location of the participant's 14 avatar may be determined, for example, based on relative movement data. The participant's 14 avatar may be initially placed at a known location (or, during the course of the simulation, may be moved to a known location). The participant 14 may be provided with the capability of moving their avatar, for example through the use of keyboard input, a joystick, body movements, etc. The instructions for moving the avatar may be transmitted to the VR server 10 or may be executed locally at the VR client 12. Based on the instructions, an updated location for the participant's 14 avatar in the simulated environment may be determined, and an updated view of the environment may be rendered. The location of the participant's 14 avatar may be recorded at the VR server 10 as 3D data 46. The location may be recorded each time the avatar location changes, or may be sampled at regular intervals.

Exemplary location data is shown in Table 2, below:

TABLE 2

Exemplary Location Data

| User ID | Project ID | Arena ID | Timestamp | Location |
| --- | --- | --- | --- | --- |
| 123456 | 987 | 859 | 12:01:01 | (21.6, 77.2, 99.2) |
| 123456 | 987 | 859 | 12:01:02 | (21.6, 77.2, 99.2) |
| 123456 | 987 | 859 | 12:01:03 | (22.7, 74.2, 99.2) |
| 123456 | 987 | 859 | 12:01:04 | (19.1, 73.2, 99.2) |

In addition to the location data, the system may record information about the direction of the participant's 14 gaze. The direction of the participant's 14 gaze may be determined directly, indirectly, and/or may be imputed.

The participant's 14 gaze location may be determined directly, for example, by tracking the movement of the participant's 14 eyes using eye tracking hardware. The eye tracking hardware may be present in the visual display device 40, or may be provided separately.

The participant's 14 gaze location may be indirectly determined by measuring a variable that is correlated to eye movement. For example, in a virtual reality environment, a user may change their perspective by turning their head. In this case, it may be assumed that the user is primarily directing their attention to the center of the display field. If the user wishes to see something in their periphery, the user will likely turn their head in that direction. Accordingly, The participant's 14 gaze location may be estimated to be the center of the display field of the visual display device 40.

Alternatively or in addition, the participant's 14 gaze location may be imputed using logic that analyzes the user's behavior. For example, if the participant 14 interacts with the simulated environment by clicking in a browser 42, the location of the participant's 14 clicks may be used as a proxy for the location at which the participant 14 has placed their attention. Alternatively, a survey question may be presented directly asking the user where they have placed their attention. The survey responses may be analyzed to impute the user's behavior.

Exemplary gaze data is shown in Table 3, below:

TABLE 3

Exemplary Gaze Data

| User ID | Project ID | Arena ID | Timestamp | Center Gaze Location |
|---------|-----------|----------|-----------|---------------------|
| 123456 | 987 | 859 | 12:01:01 | (21.6, 77.2, 99.2) |
| 123456 | 987 | 859 | 12:01:02 | (21.6, 77.2, 99.2) |
| 123456 | 987 | 859 | 12:01:03 | (22.7, 74.2, 99.2) |
| 123456 | 987 | 859 | 12:01:04 | (19.1, 73.2, 99.2) |

Once the location and gaze information are collected as VR data 44, the VR data may optionally be translated into, or combined with, legacy data 48. For example, 2D data (such as mouse clicks or hover times over a 2D canvas) and eye-mapping data 52 (representing the results of eye mapping studies) may be existent in the VR server 10. This data may have been previously analyzed to determine consumer preferences, and this preference information may be correlated with the new VR data 44 in order to avoid the duplication of existent work. Data mapping logic 54 may translate the VR data 44 into legacy data 48 and/or vice versa.

The VR data 44 may be processed by data processing logic 56 to evaluate where the participant 14 has directed their attention. The data processing logic may include, for example, a gaze box calculator 58 and scoring rules 60.

The gaze box calculator 58 may analyze the location data to determine where the user's gaze was directed (i.e., what part of the simulated environment the user looked at). The gaze box calculator 58 may calculate one or more areas in the participant's 14 view and use the scoring rules 60 to assign a score to each area, depending on the amount of attention the participant 14 gave to the area or the likelihood that the participant 14 was looking at the identified area. The gaze box calculator 58 and scoring rules 60 are discussed in more detail with respect to FIG. 12 below.

Furthermore, the participant's 14 gaze location and/or location information may be provided to trigger logic 62. The trigger logic 62 may compare the participant's 14 gaze location or avatar location to a list of trigger points in the simulated environment. If the participant gazed at, or moved to, a trigger point, then the trigger logic 62 may trigger an action, such as the posing of a survey question 24 to the participant 14. For example, the trigger logic 62 may retrieve a survey question 24 from the hardware agnostic input data 20 and forward the survey question 24 to survey logic 64 located at the VR client 12. The survey logic 64 may cause the survey question 24 to be presented to the participant 14, for example by popping up a survey window in the participant's 14 field of view. Alternatively or in addition, the survey question may be presented using auditory cues (e.g., a recording of the question may be played on a speaker associated with the participant's 14 VR client 12).

Upon receiving the survey question 24, the participant 14 may indicate an answer to the survey question. The answer may be provided, for example, via keyboard input, through a microphone, or through a gesture (such as moving the participant's 14 head, which may be recognized by an accelerometer in the visual display device 40). The participant's 14 answers to the survey questions may be stored in the VR data 44 at the VR server 10.

Although FIG. 1 depicts particular entities in particular locations, one of ordinary skill in the art will understand that more, fewer, or different entities may be employed. Furthermore, the entities depicted may be provided in different locations. For example, although FIG. 1 depicts the translation logic 28 as being resident on the VR server 10, the translation logic 28 may alternatively be located at the VR client 12, so that the VR server 10 sends the hardware agnostic input data 20 to the VR client 12, and the VR client 12 performs the translation. Similarly, the trigger logic 62 and/or the data processing logic 56 may be located at the VR client 12, the survey logic 64 may be located at the VR server 10.

The entities depicted in FIG. 1 may also be split between the VR server 10 and the VR client 12. For example, some of the logic for implementing the interfaces 30 or the trigger logic 62 may be provided at the VR server 10, while the rest of the logic is provided at the VR client 12. Alternatively or in addition, some or all of the entities of FIG. 1 may be provided at an intermediate device distinct from the VR server 10 and the VR client 12.

Thus, the VR server(s) 10 and VR client(s) 12 may interoperate to provide a simulated environment and allow multiple different types of users to interact with the simulated environment in order to perform behavioral research. Examples of simulated environments are described next.

Exemplary Simulated Environments

Figure 2B:
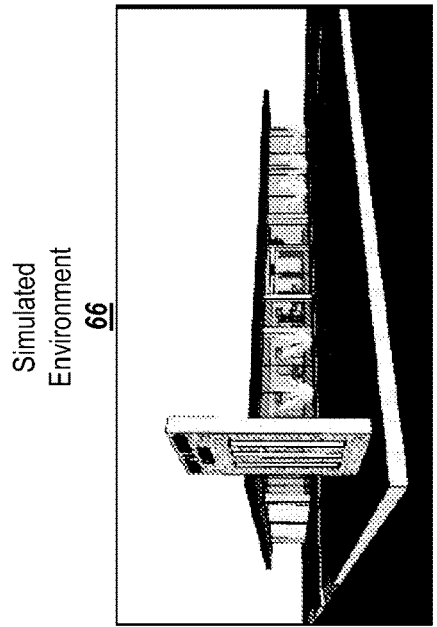
FIGS. 2A-2C depict examples of different simulated environments.
Figure 2A:
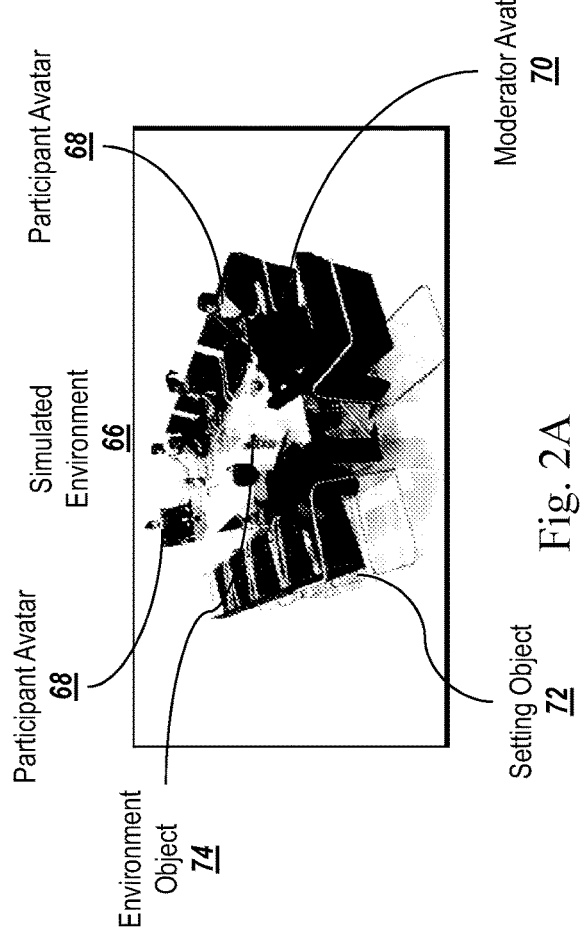
Figure 2C:

FIGS. 2A-2C depict examples of simulated environments 66 suitable for use with exemplary embodiments.

For example, FIG. 2A depicts a simulated environment 66 representing a focus group. Several participant avatars 68 are present in the simulated environment 66, as well as a moderator avatar 70. Each participant 14 may view the simulated environment 66 from the perspective of the participant's avatar 68, and the moderator may view the simulated environment 66 from the perspective of the moderator avatar 70.

In addition to the avatars 68, 70, the simulated environment 66 may be populated by one or more setting objects 72. Setting objects may represent objects placed in the simulated environment 66 in order to provide context or realism, such as table and chairs. Moreover, within the simulated environment 66, products may be presented for comparison. The products may be represented by objects placed in the simulated environment 66, referred to herein as environment objects 74.

The simulated focus group of FIG. 2A may allow products to be tested in a social or group setting, wherein the product is discussed among the participants 14. Other types of simulated environments are also possible. For example, FIG. 2B depicts an example of a simulated environment 66 representing a car dealership. Participant avatars may move through the simulated car dealership, observing products in their natural context.

Still further, FIG. 2C presents an example of a simulated environment 66 which includes a product carousel 76. Within the product carousel 76, different products (or different variations on the same product) may be viewed and moved between. A product carousel 76 may thus allow for a direct comparison between products or between different versions of a single product.

FIG. 3A-3D provide an in-depth example of a simulated environment 66. In this example, the simulated environment 66 represents a supermarket through which participant avatars can move. Products (represented by environment objects 74) may be placed on shelves (represented by setting objects 72).

Figure 3A:
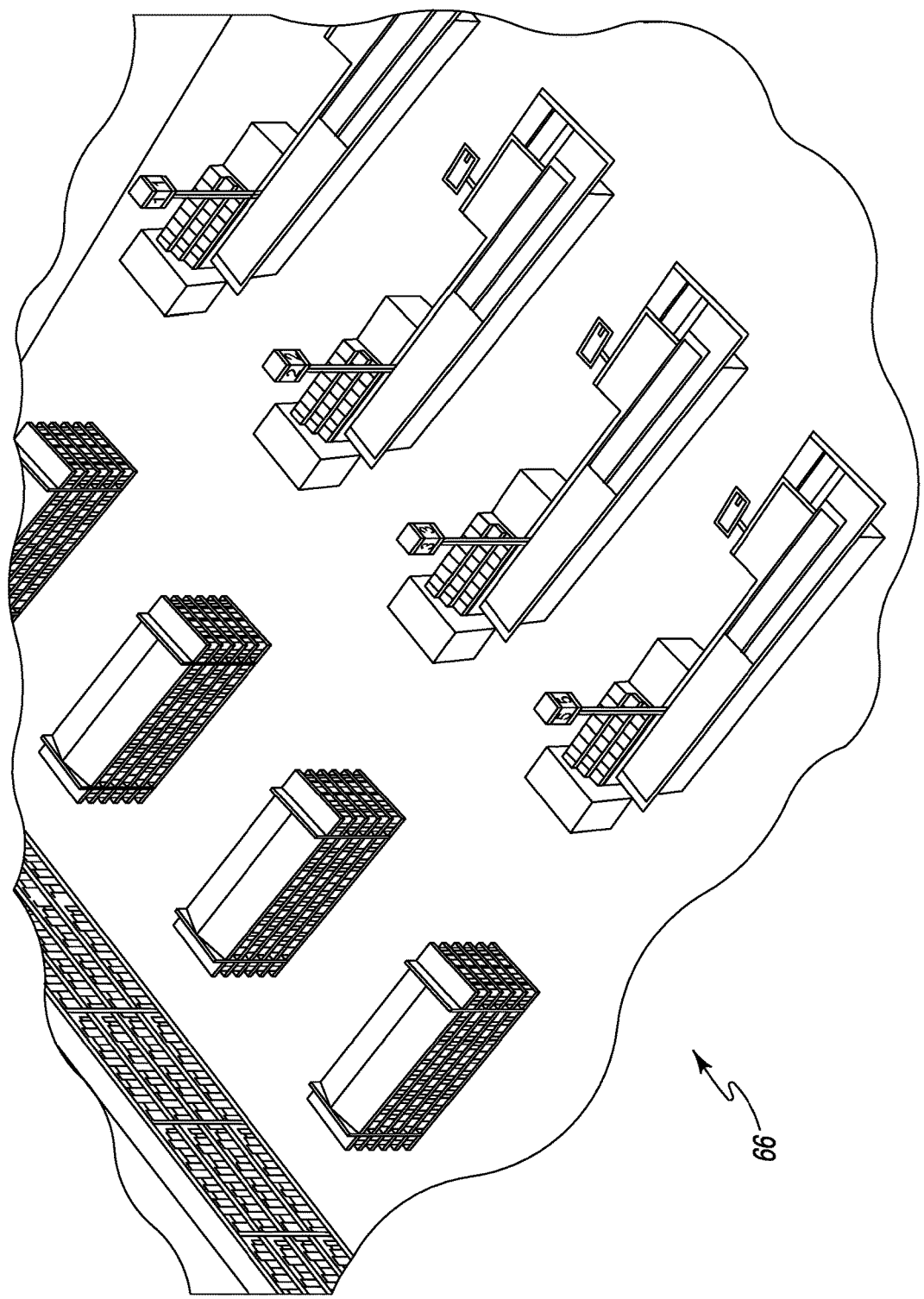
FIG. 3A-3D depict views of an exemplary simulated environment.
Figure 3B:
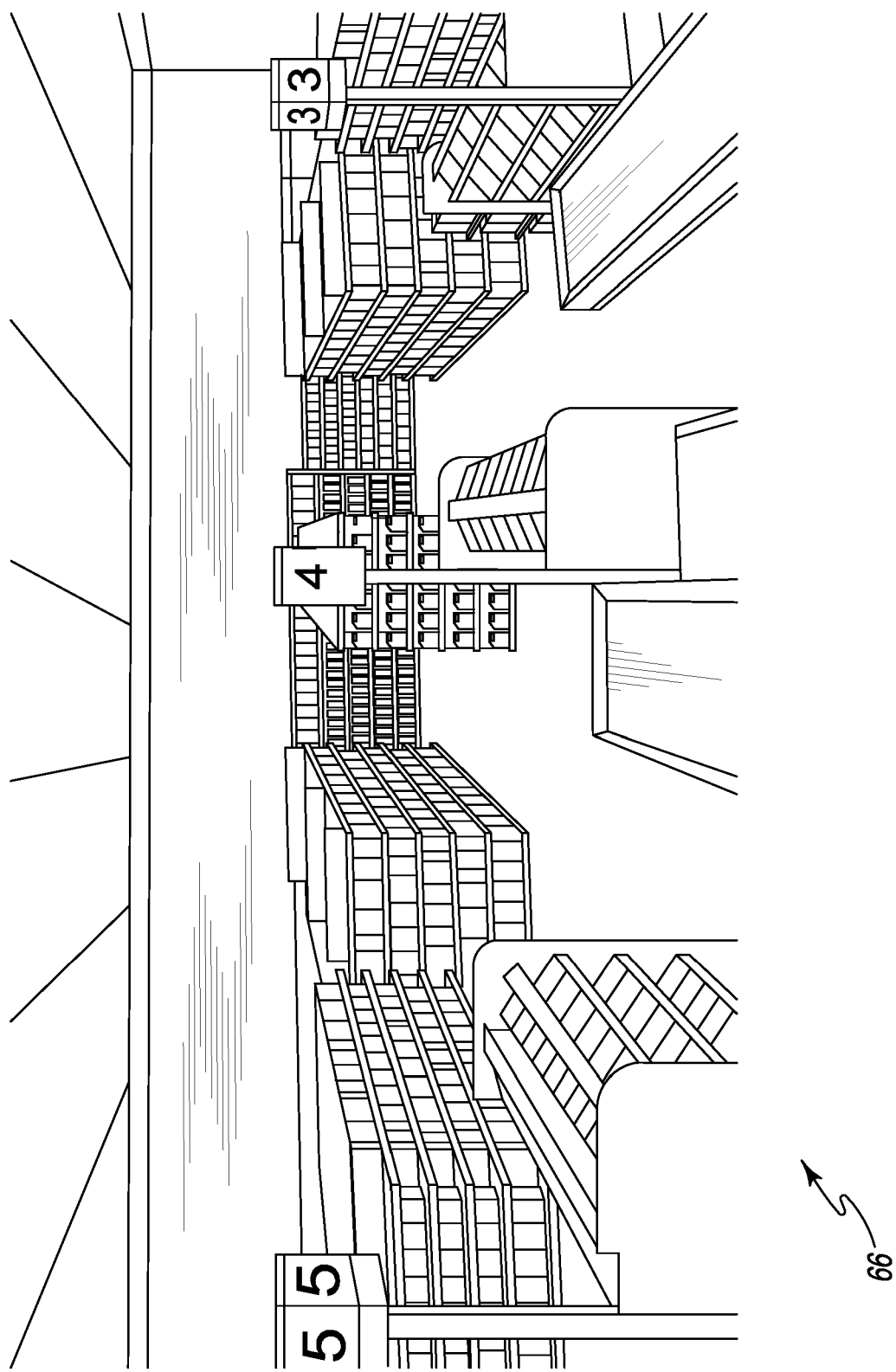

FIG. 3A is an overhead view of the simulated environment 66, while FIG. 3B is a perspective view of the simulated environment 66. In the event that a moderator 16 or a client 18 are not viewing the simulated environment from the perspective of one of the participants 14 or from the perspective of their own avatars, the moderator 16 or the client 18 may be presented with an overhead or perspective view similar to the ones depicted in FIGS. 3A and 3B.

Figure 3C:
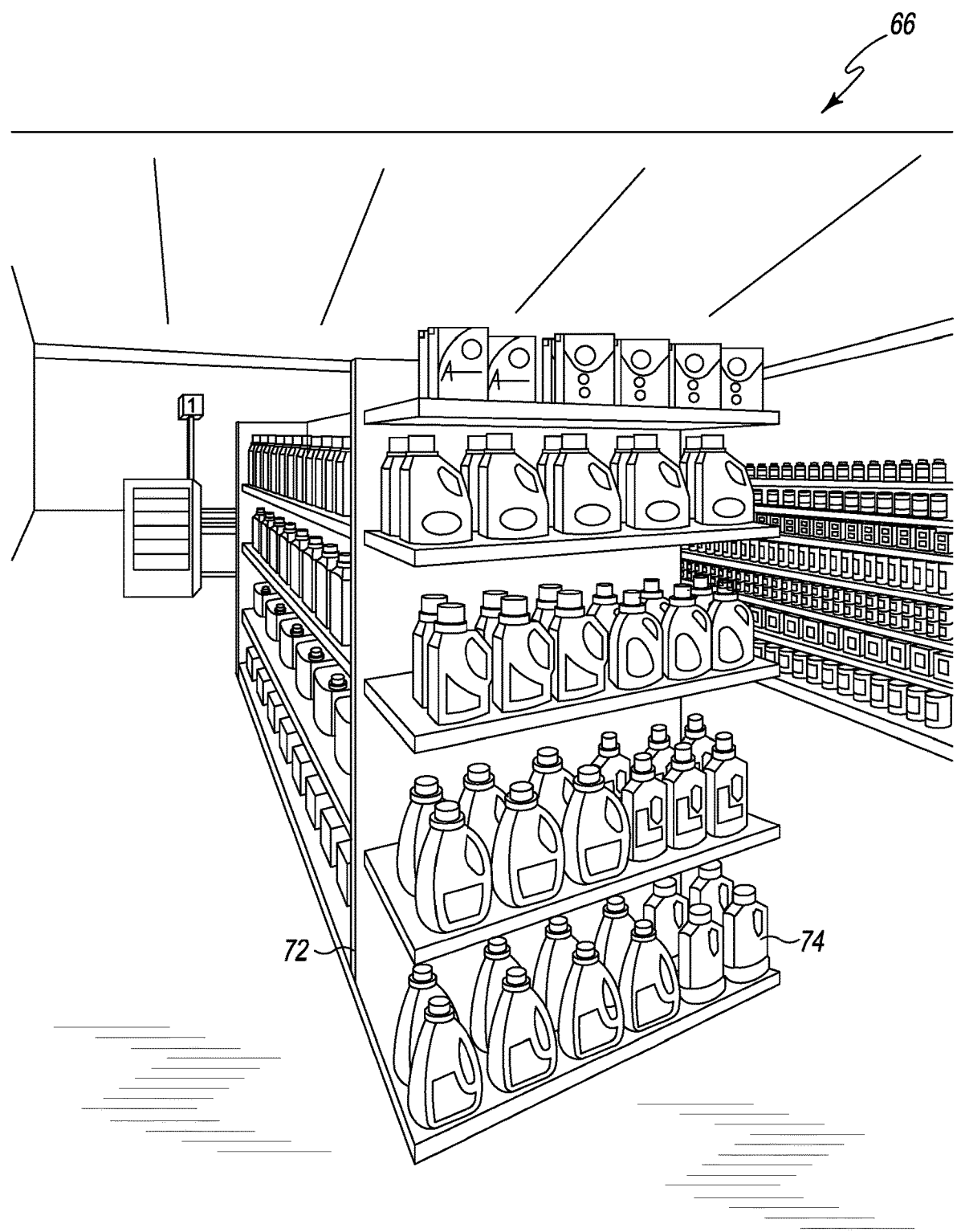
Figure 3D:
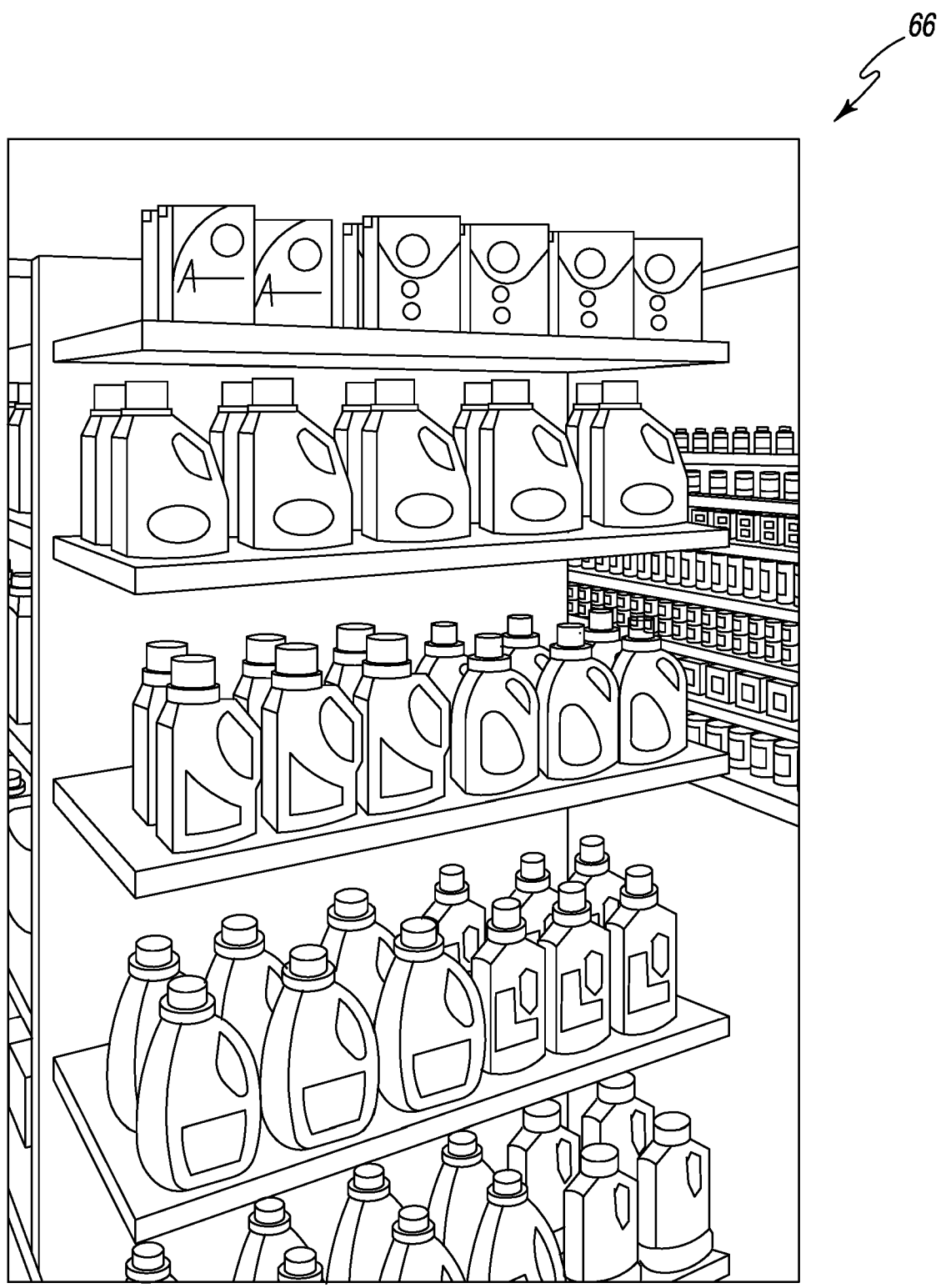

FIGS. 3C and 3D depict the simulated environment 66 as viewed from the perspective of an avatar, such as a participant avatar. FIGS. 3C and 3D provide a ground-level view of the simulated environment 66 as the user moves through the simulated environment 66, and are representative of what the user might see in the visual display device 40.

As noted above, the different types of users present in the simulated environment 66 may have different roles and/or capabilities. The VR server 10 may store different information for each of the different types of users in order to allow the users to effectively perform their roles. The stored information pertaining to each type of user may be collected through the respective interfaces, and is described in more detail below.

User Data

Figure 4:
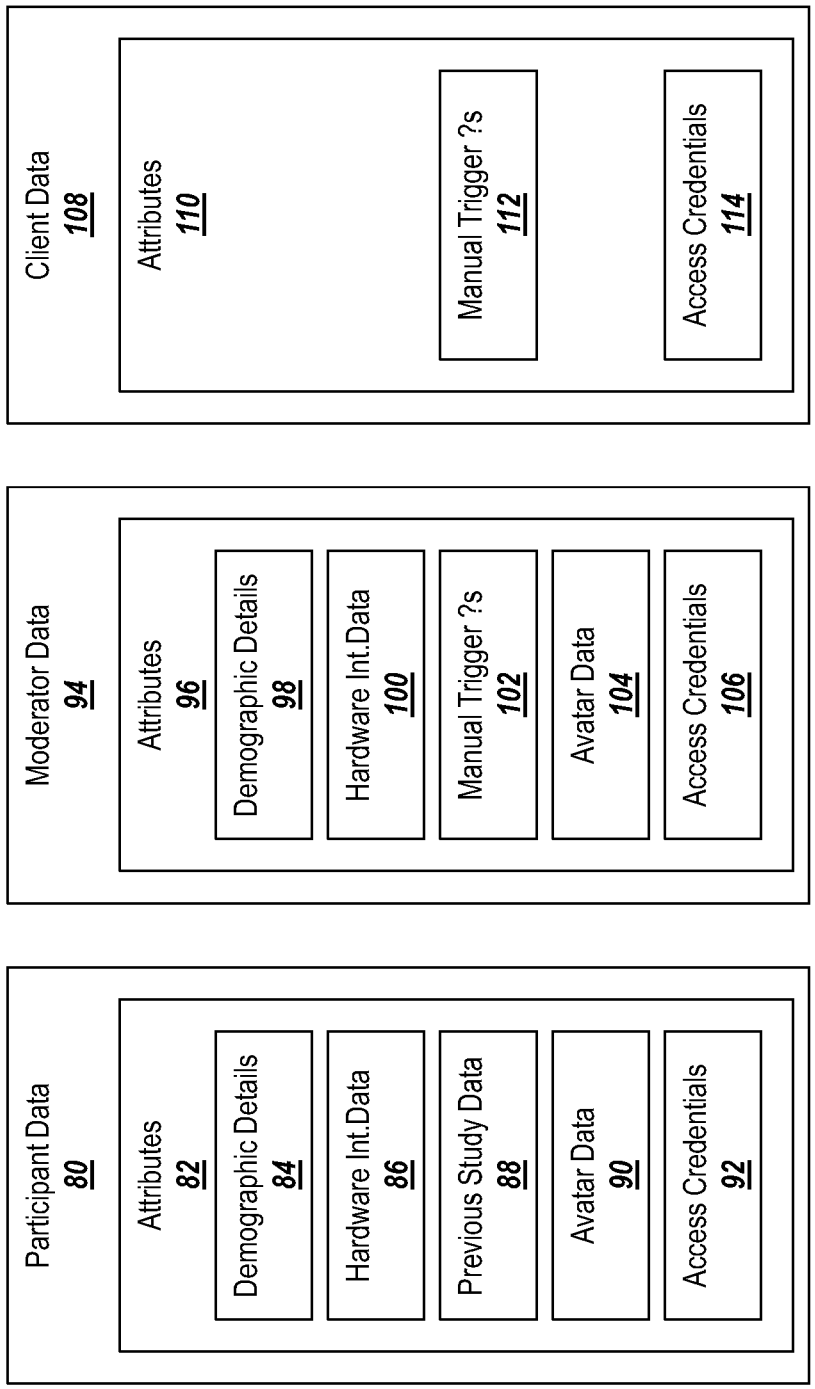
FIG. 4 depicts exemplary data representative of different types of users and interfaces.

FIG. 4 depicts examples of the types of data that may be stored for each type of user.

For a participant 14, the VR server 10 may store participant data 80, which may include a number of attribute 82 of the participant. For example, the attributes 82 may include demographic details that describe the demographics of the participant. Exemplary demographic details are described in Table 4:

TABLE 4

| Demographic Details | | |
|---|---|---|
| Variable | Notes | Comment |
| Name | First/Last Name and/or Alias | |
| User ID | Serialized ID across system | Allows a single user to exist across multiple environments or projects |
| Contact | Email address, phone number, etc. | Contact details for the user |
| Previous Studies | Array of previous study information | Used to calibrate experience quotient |
| Age | | Used to calibrate experience quotient |
| Total Experience Time | Calculated value of total time in VR research environments | Used to calibrate experience quotient |
| General Data | Income, gender, race, ZIP code, etc. | General background data used for profiling respondent |
| Social Data | FACEBOOK ID, TWITTER handle, etc. | |

The attributes 82 may further include hardware interface data 86 describing the type of hardware (e.g. visual display device 40, browser 42, and/or VR client 12) used by the participant. Exemplary hardware interface data 86 is described in Table 5:

TABLE 5

| Hardware Interface Data | | |
|---|---|---|
| Variable | Notes | Comment |
| IP Address | Current logged in IP address | |
| Hardware Profile | Virtual Reality headset device type, PC or gaming device information, profile data about connected devices, etc. | Allows Virtual Reality Experience to be customized to the user's headset or gaming unit |
| VR Experience Status | List of current simulated environments loaded on the local device, including | |

TABLE 5-continued

| Hardware Interface Data | | |
|---|---|---|
| Variable | Notes | Comment |
| VR Device Status | percentage downloaded of each Current device statuses (e.g., online, connected, disconnected, high latency, etc.) | |

The attributes 82 may further include previous study data 88 describing the results of previous behavioral studies performed by the participant through the VR server 10 and/or using traditional methods. Exemplary previous study data 88 is described in Table 6:

TABLE 6

| Previous Study Data | | |
|---|---|---|
| Variable | Notes | Comment |
| Previous Studies | Array of previous studies completed in VR or using traditional methods | |
| Study Results | Gaze Map converted results from previous studies | Allows a user to synthetically replay previous study answers in VR space |

The attributes 82 may further include avatar data 90 representing information used to generate the participant's avatar in the simulated environment. For example, the avatar data 90 may include image data used for rendering the participant's avatar, as well as other descriptive details (e.g., height, weight, gender, etc.).

The attributes 82 may further include access credentials that are used by the participant to access the VR server 10 and/or the simulated environment. Exemplary access credentials 92 are described in Table 7:

TABLE 7

| Access Credentials | | |
|---|---|---|
| Variable | Notes | Comment |
| User ID | e.g., username or email address | |
| Password | User or system created password | |

Similarly to the participant 14, the moderator may 16 be associated with moderator data 94, which includes attributes 94 similar to the attributes of the participant. For example, the moderator data 94 may include demographic details 98, hardware interface data 100, avatar data 104, and access credentials 106 generally corresponding to those of the participant data 80.

The moderator data 94 may also include manual trigger questions 102, which may include survey questions that the moderator may cause to be asked of some or all participants at any time. In some embodiments, the manual trigger questions 102 may be displayed on a heads up display (HUD) of the moderator, so that the moderator may ask the participants the manual trigger questions (e.g., through a microphone and speaker).

The client 18 may be associated with client data 108. Because (in some embodiments) the client does not interact with the simulated environment except to observe the simulated environment, it may not be necessary to collect as many attributes 110 for the client as for the participants and the moderators. For example, the client data 108 may include manual trigger questions 112 similar to the manual trigger questions 102 of the moderator data 94, and access credentials 114 for allowing the client to access the simulated environment 66 and/or the VR server 10.

Figure 5A:
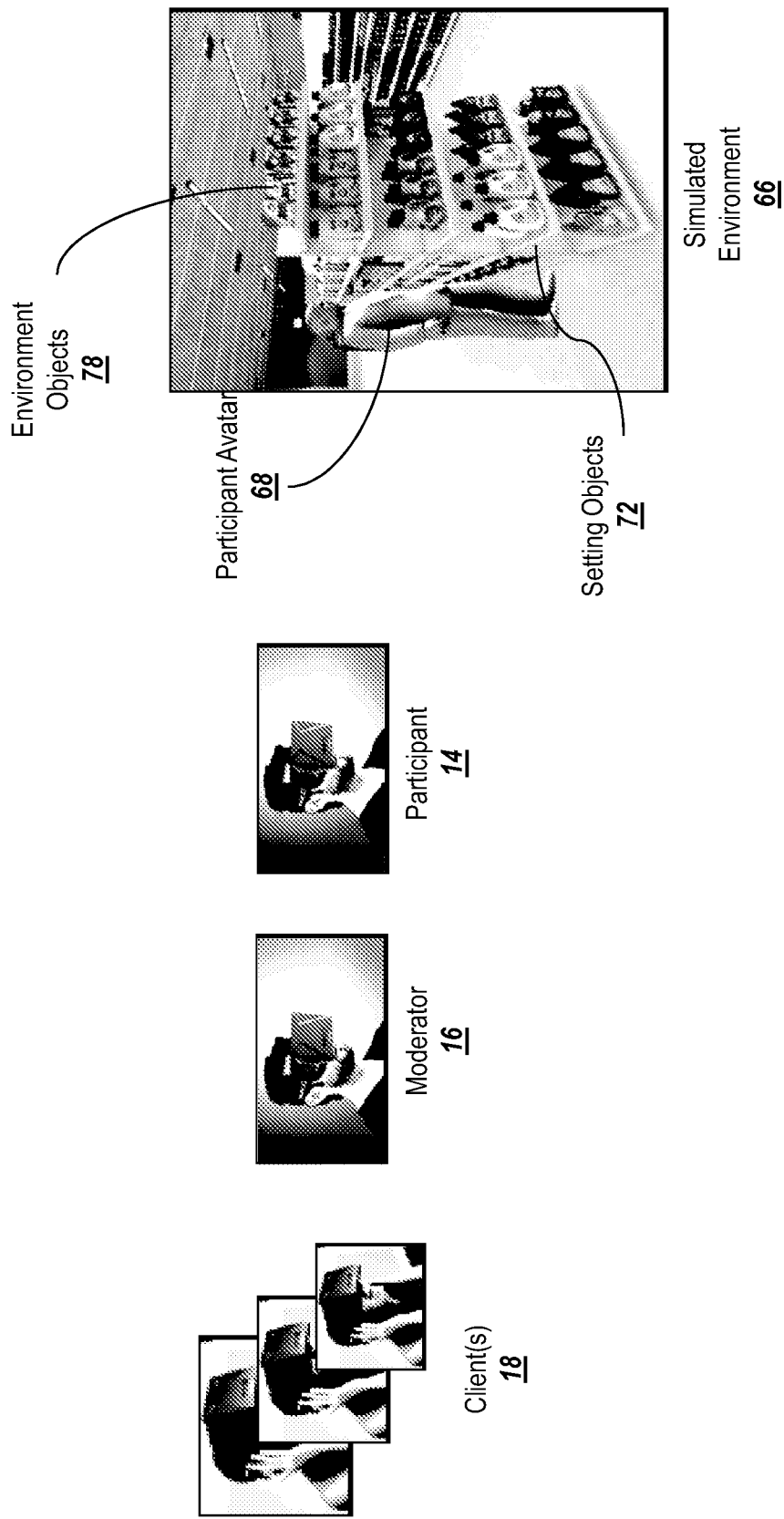
FIGS. 5A-5B depict exemplary embodiments in which one or more participants interact with the simulated environment.
Figure 5B:
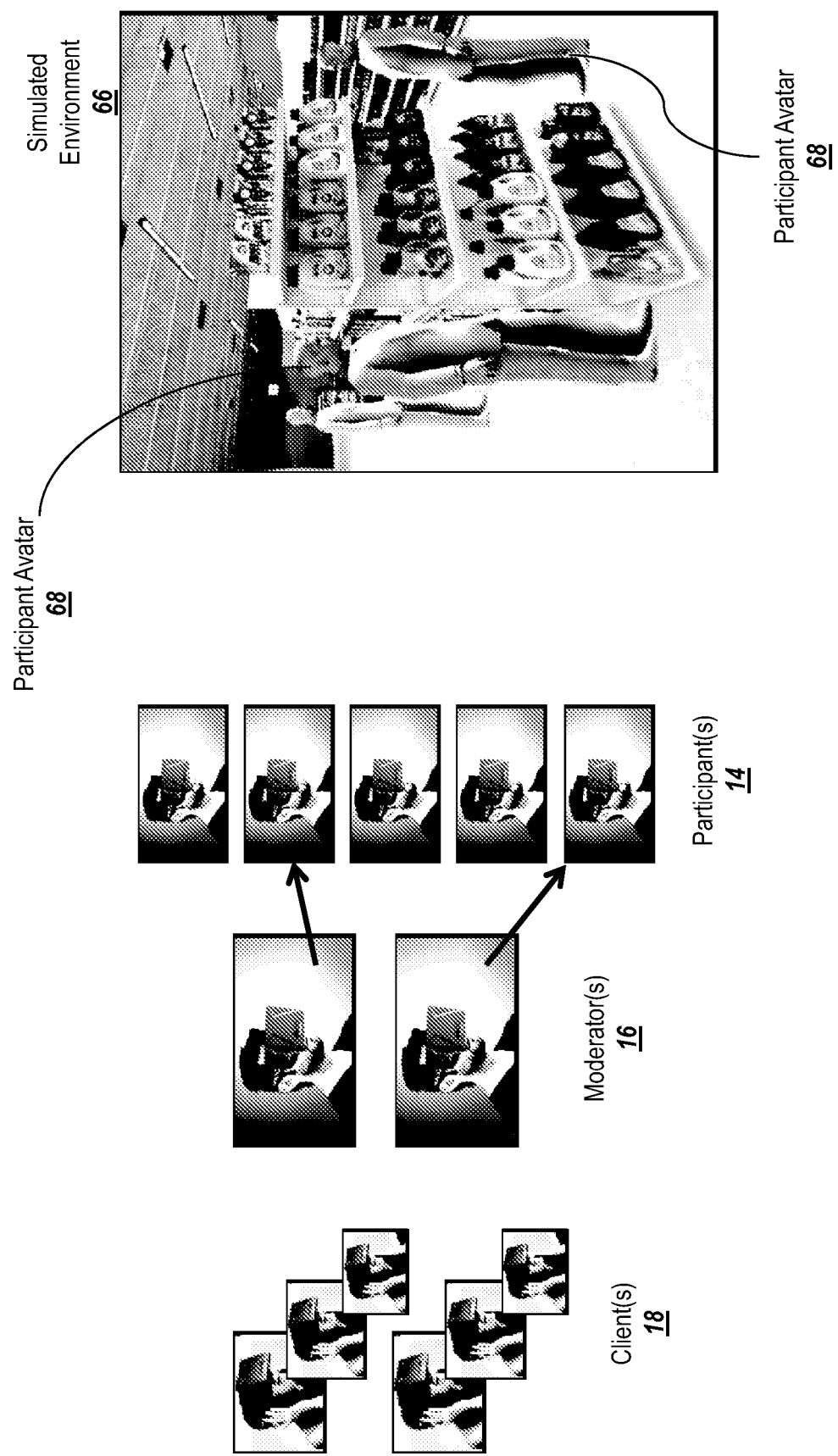

FIGS. 5A and 5B depict the participant(s) 14, the moderator(s) 16, and the client(s) 18 interacting with the simulated environment 66. FIG. 5A is an example in which a single participant 14 is present in the simulated environment while being directed by a single moderator 16. Multiple clients 18 may view the simulated environment, e.g. in a top-down perspective or from the perspective of the participant avatar 68.

FIG. 5B is an example in which multiple participants 14, moderators 16, and clients 18 interact with the simulated environment 66. As can be seen in FIG. 5B, each participant 14 may be provided with a participant avatar 68, and participants 66 may see other avatars in the simulated environment 66. Clients 18 and moderators 16 may choose which participants they wish to observe (e.g., by viewing the simulated environment 66 from the perspective of the selected participant, or by attaching an overhead "camera" to the selected participant and watching the participant from a third-person view). Alternatively or in addition, the clients 18 and the moderators 16 may observe the simulated environment 66 from a third person perspective, without following a particular participant. The clients 18 and the moderators 16 may be provided with interface options for switching their perspectives among the available options in real time.

The establishment and configuration of a simulated environment will be discussed next.

Simulated Environment Initial Setup and Configuration

Figure 6:
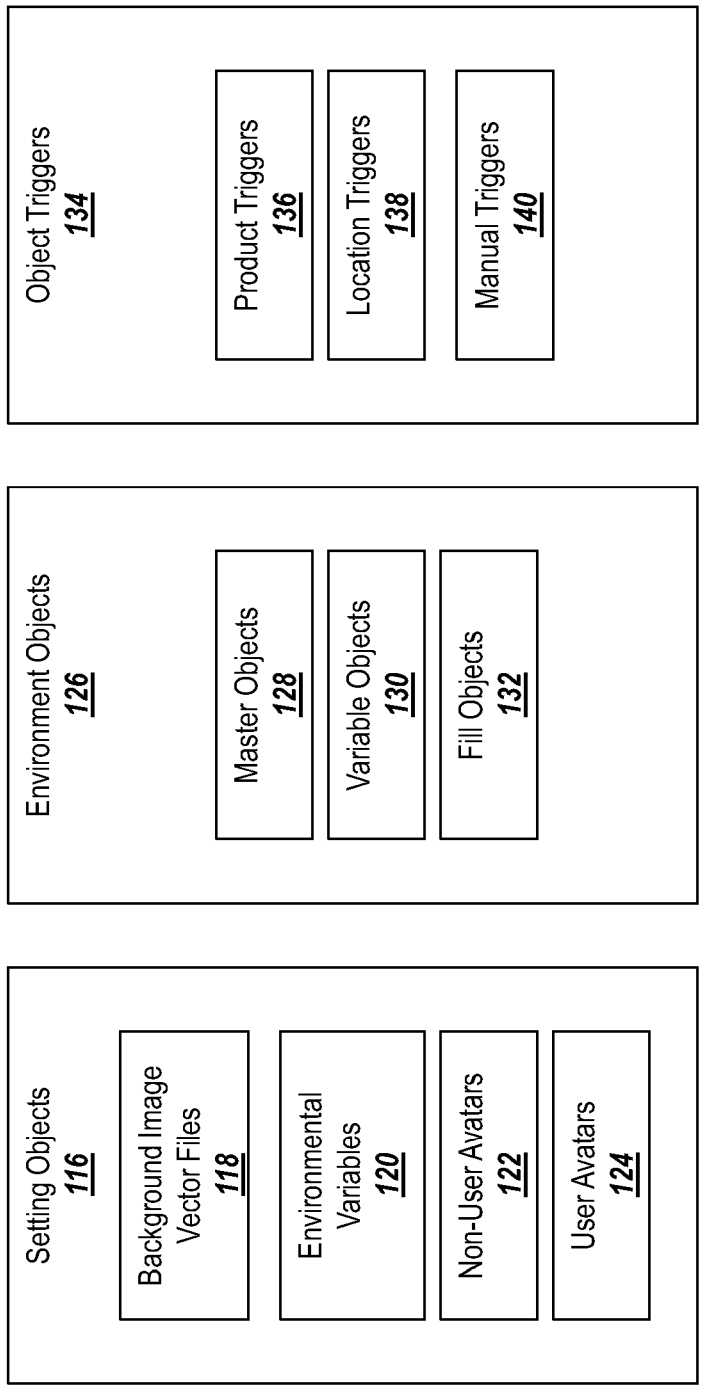
FIG. 6 depicts an exemplary format for objects and triggers suitable for use in exemplary simulated environments.

As noted above, and as depicted in FIG. 6, the simulated environment may be made up of setting objects 116, environment objects 126, and object triggers 134.

The setting objects 116 may represent objects that define the setting and/or context of the simulated environment. The setting objects may include background image vector files 118, which may be images that are rendered in the background of the simulated environment and may change depending on what type of simulated environment is being rendered. For example, the background image vector files 118 may include images representing the walls and shelves of a grocery store, a sales floor in a car dealership, a design showroom, etc.

The setting objects 16 may further include environmental variables 120. The environmental variables may further define how the simulated environment is represented, and may include elements such as music or other audio to be played in the simulated environment, details regarding lighting settings, etc.

The setting objects may also include non-user avatars 122 and user avatars 124. User avatars 124 may represent any participants, moderators, and/or clients (if client avatars are enabled) that are present in the simulated environment. Non-user avatars 122 may include simulated avatars that are not associated with any particular user, such as simulated virtual shoppers that behave according to pre-programmed and/or dynamic behaviors. Non-user avatars 122 may be entirely pre-programmed, and/or may be synthesized from other participant movements or legacy participant data.

The environment objects 126 include items that may be found in the simulated environment, such as cars, tires, products, etc. The environment objects 126 may include master objects 128. The master objects 128 include objects under study in the simulated environment, such as consumer products. The master objects 128 may include high resolution 3D vector maps of the target products.

The environment objects 126 may further include variable objects 130. The variable objects 130 may include variable visual information data points that may be mapped to the environment, such as changing price labels, varied product quantities, etc.

The environment objects 126 may further include fill objects 132. The fill objects 132 may include objects that are not an object of study, but which are present in the simulated environment to provide for a more realistic setting. For example, fill objects 132 may include product shelf displays, advertisements, etc.

The object triggers 134 may represent points in the simulated environment that, when interacted with, may cause an event (such as the posing of a survey question) to occur. The object triggers 134 may include product triggers 136. The product triggers 136 may be trigger locations associated with a particular product (e.g., a particular master object 128 or class of master objects 128), and may cause the display of a probing question based on an amount of gaze time or gaze points associated with the object.

The object triggers 134 may also include location triggers 138. The location triggers 138 may provide a visual display of a probing question based on the participant's avatar location in the simulated environment, or the amount of time that it takes the participant's avatar to reach a particular location.

The object triggers 134 may further include manual triggers 140, which may be triggers that can be activated by the moderator or a client. The triggers may cause a selected question from a question library to be posed, and may be triggered at any time.

FIG. 7 depicts examples of objects that may be used to make up the simulated environment in more detail. Specifically, FIG. 7 depicts a hardware agnostic canvas 22 having a number of environment objects 126, and translation mapping information 142 that may be used by the translation logic 28 to render the environment objects 126 in the simulated environment.

As can be seen in FIG. 7, the environment objects in the hardware agnostic canvas may include a number of details, such as an object ID for uniquely identifying the object, an object type, a location at which the object's data files (e.g., images for rendering the object, audio files played by the object, etc.) are stored, any trigger IDs associated with the object, and hardware-agnostic 3D coordinates for defining the object's location in the simulated environment.

The translation mapping information 142 may include hardware-specific information allowing the translation logic 28 to determine how the environment objects should be represented on particular hardware. For example, the translation logic may determine where (in an objective Cartesian coordinate system) the object should be displayed with respect to the participant's current perspective in the simulated environment, and may display the object at the location in the participant's field of view. The translation logic 28 may use information such as the resolution of the participant's hardware viewer, the hardware viewer's brightness and color settings, and information about whether the hardware viewer is capable of audio playback (among other hardware-specific information) in order to render the object appropriately for the hardware. For example, in the case of an environment object having vector image data, the image data may be stretched, rotated, etc. in order to be rendered properly on the participant's hardware at the specified location.

Figure 8:
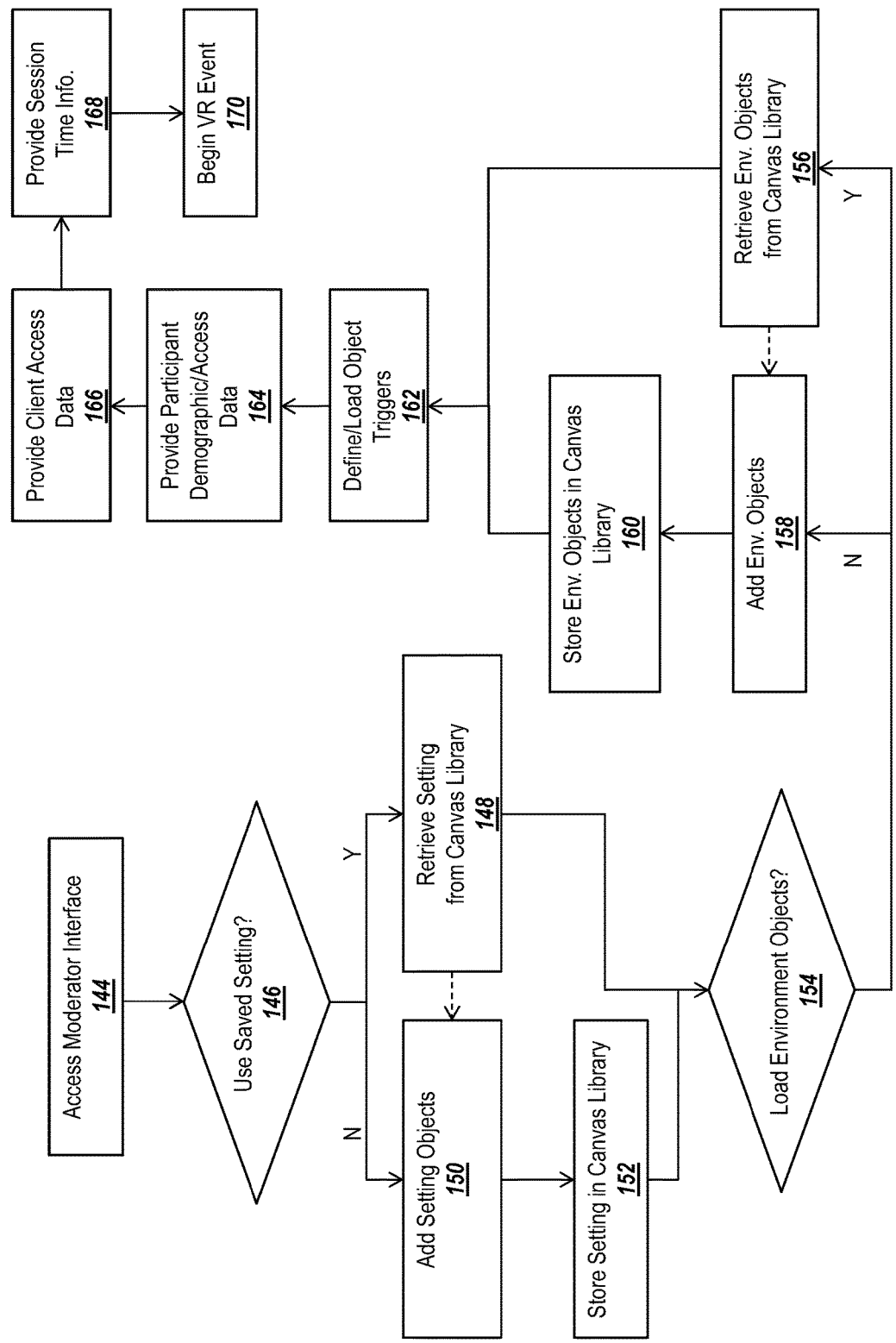
FIG. 8 is a flowchart describing an exemplary method for building a hardware-agnostic canvas representing a simulated environment.

The setting objects 116, environment objects 126, and object triggers 134 may be used to build a simulated environment. FIG. 8 is a flowchart describing an exemplary process for building the simulated environment.

The simulated environment may, in some embodiments, be built by a moderator 16. Accordingly, at step 144 a user may log into the VR server 10 through the moderator interface 36. Among other options in the moderator's user interface, the VR server 10 may display an option for creating a simulated environment. Upon selection of this option, the VR server 10 may provide an interface for building a hardware agnostic canvas 22 for the simulated environment.

Previously built settings (e.g., generic settings such as grocery stores, car dealerships, or focus group rooms which may or may not be populated with environment objects) may be stored in a library for re-use. At step 146, the moderator 16 may be presented with an option for loading a pre-built setting from the library. If the moderator 16 chooses to load a pre-built setting at step 146, then processing may proceed to step 148 and the selected setting may be retrieved from the library. Processing may then (optionally) proceed to step 150, where additional setting objects may be added to the pre-built setting. If moderator does not choose to load a pre-built setting at step 146, then processing may proceed directly to step 150 and the setting may be built by placing setting objects in the blank setting.

After building the setting with setting objects at step 150, processing may proceed to step 152 and the moderator 16 may be presented with the option to save the built canvas in the canvas library for future use.

Once the moderator 16 is done placing setting objects, processing may proceed to step 154 and the moderator 16 may be provided with an interface for placing environment objects in the simulated environment. Alternatively or in addition, the moderator 16 may choose to rely on environment objects stored with the saved setting retrieved in step 148 and/or a previously stored environment object set that may be imported into the setting developed at steps 146-152.

If the moderator 16 chooses to rely on a previously-stored environment object set, processing may proceed to step 156 where the object set may be loaded (e.g., from the canvas library) and added to the simulated environment. Optionally, processing may then proceed to step 158, where additional environment objects may be added (e.g., from the canvas library), and from there to step 160 where the environment objects added to the simulated environment may optionally be saved in the canvas library for future use.

Processing may then proceed to step 162, where object triggers may be defined or loaded from the hardware agnostic input data 20. For example, an interface may be provided for allowing the moderator 16 to define survey questions, locations at which the questions are triggered, a required number of gaze points in order to trigger the questions, etc.

At step 164, the moderator 16 may define participant demographic information and access credentials. For example the moderator 16 may provide a list of users (e.g., a list of user IDs) who are permitted to participate in a research project involving the simulated environment established in steps 144-162. The participants may access the simulated environment through a participant interface 32 in the VR server 10. In some embodiments, the moderator 16 may define a list of demographics which a participant must have in order to access the simulated environment. In such a situation, the VR server 10 may assign participants to different simulated environments depending on their demographics.

At step 166 the moderator 16 may define client access data for allowing clients to access the simulated environment. For example, the moderator 16 may provide a list of client user IDs allowing the clients to log into client interfaces 38 in the VR server 10.

At step 168, the moderator 16 may provide session time information. The session time information may define at time at which a research project in the simulated environment is scheduled to take place. If a user attempts to log into the simulated environment at a time outside of the session time defined in step 168, an error message may be displayed informing the user when the research project is scheduled to begin. In some embodiments, users may be allowed to log into the research project a short predetermined amount of time prior to the session time defined in step 168. In this case, the user may be placed into a waiting room until the appointed time for the research project, and then may be placed in the simulated environment.

At the appointed time defined in step 168, processing may proceed to step 170, and the research project session may begin.

Figure 9:
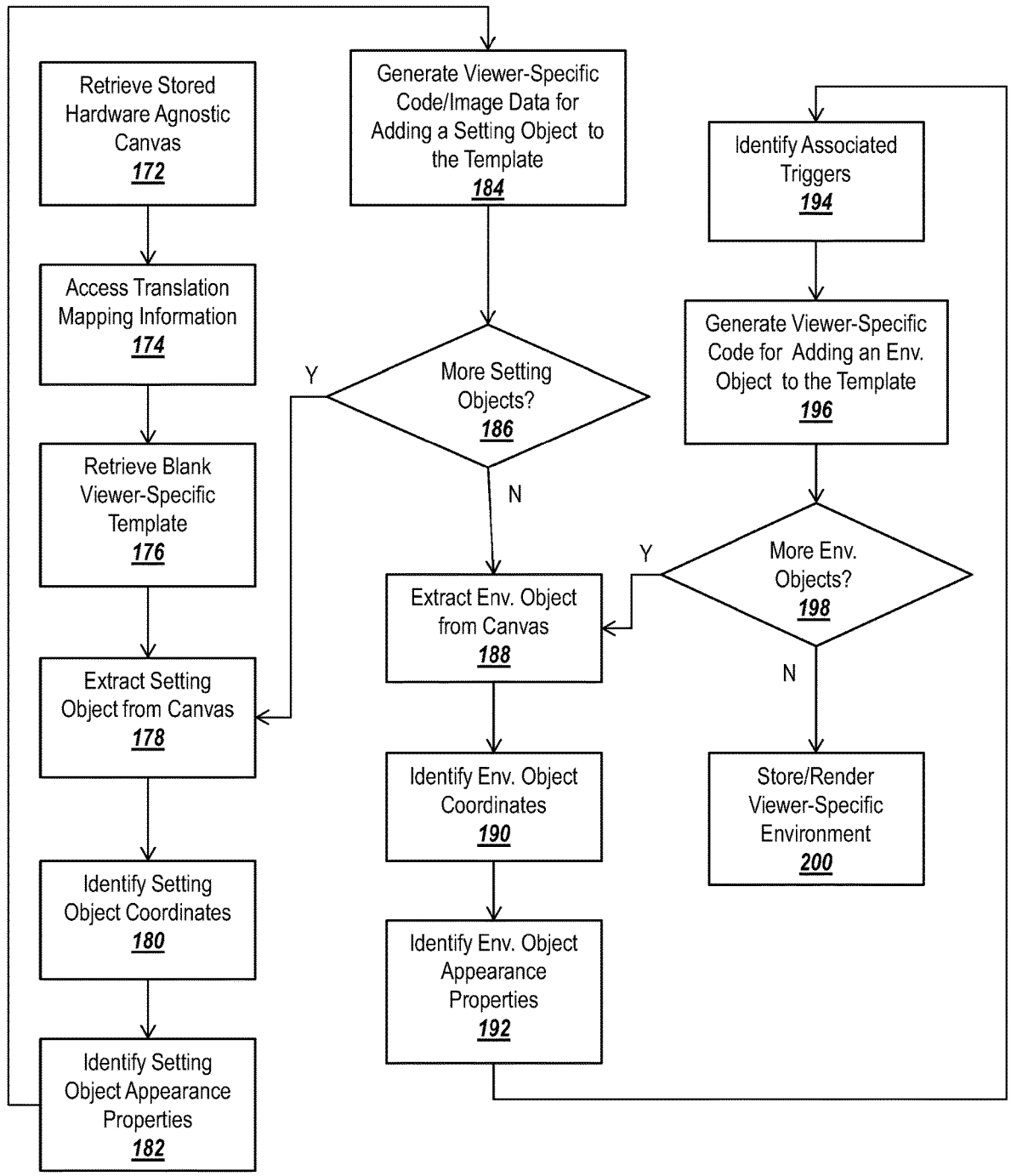
FIG. 9 is a flowchart describing an exemplary method for translating a hardware-agnostic canvas into viewer-specific code suitable for use on exemplary environment viewers.

Once the research project begins, the VR server 10 may employ the translation logic 28 in order to render the simulated environment defined in steps 144-162 on user-specific hardware. FIG. 9 is a flowchart describing exemplary steps that may be performed by the translation logic 28.

Processing may begin at step 172, where a stored hardware-agnostic canvas associated with the current research project may be retrieved from the canvas library 22. In order to appropriately render the hardware agnostic canvas on user-specific hardware, translation mapping information describing how to render an environment on the user-specific hardware may be used. Such translation mapping information may be retrieved at step 174. The translation mapping information may be stored with, or separately from, the hardware agnostic canvas.

At step 176, the translation logic may retrieve or construct a blank hardware-specific scene or template. This may serve as the basis for a hardware-specific scene, to which setting and environment objects will be added. Alternatively, in some embodiments an entire scene may be generated in a hardware agnostic format, and then displayed on user-specific hardware by translating the finished scene.

At step 178, the translation object mat retrieve a setting object from the canvas. For example, if the setting objects are stored in a database, the translation logic may retrieve the next setting object from the database. The setting object may be associated with location information, such as coordinates in a Cartesian plane that are defined with respect to the simulated environment and/or the blank scene or template. This location information may be retrieved from the canvas library at step 180.

At step 182, appearance properties for the setting object may be retrieved. For example, a definition of the setting object may include a pointer or reference to image files (e.g., vector graphic images) that are used to draw the setting object in the simulated environment. The pointer or reference may be followed to extract the vector images from the associated image files.

At step 184, viewer-specific code or image data may be generated and added to the blank template generated at step 176. The code or image data may be generated, at least in part, based on the appearance properties determined at step 182, the object coordinates retrieved at step 180, and the translation mapping information retrieved at step 174. For example, the translation logic may consult the translation mapping information to determine display properties for the user-specific viewer hardware. The translation logic may use the location information to determine where, with respect to the direction the user may be looking (or how the user would observe the setting object from various angles), the object should be placed. The translation logic may place the object at the location, and may correct the object's image data based on the translation mapping information (e.g., by manipulating the object's image data, such as by stretching or rotating the object).

At step 186, the translation logic may determine whether there are additional setting objects to be added to the simulated environment. If so, processing may return to step 178 and additional setting objects may be added to the scene.

Once all the setting objects have been added to the scene, processing may proceed to step 188 and a similar process to that described at steps 178-184 may be carried out for environment objects. Step 188 generally corresponds to step 178, step 190 generally corresponds to step 180, step 192 generally corresponds to step 182, step 196 generally corresponds to step 184, and step 198 generally corresponds to step 186.

One additional step may be performed at step 194 with respect to the environment objects, which may involve identifying any triggers associated with the environment objects. The triggers may be associated with object or location data, and survey questions that may be displayed when the location or object is approached or viewed. Step 194 may involve generating code for the user-specific hardware that causes the survey questions to be posed when the user-specific hardware identifies that the triggering conditions are met. Alternatively or in addition, the trigger points may be triggered by the VR server 10 when the user-specific hardware reports that the user has approached or viewed the location associated with the trigger point.

In some embodiments, triggers may be associated with locations in the simulated environment rather than, or in addition to, associating the triggers with the environment objects.

Once the trigger points and environment objects have been added to the scene, processing may proceed to step 200 where the now-completed view of the simulated environment may be sent to the user-specific hardware, rendered by the user-specific hardware, and/or saved for future use.

Thus, a simulated VR environment may be constructed and rendered for a variety of users. User interaction with the VR environment is next described with respect to FIGS. 10-11.

Virtual Reality Environment Interaction

Figure 10:
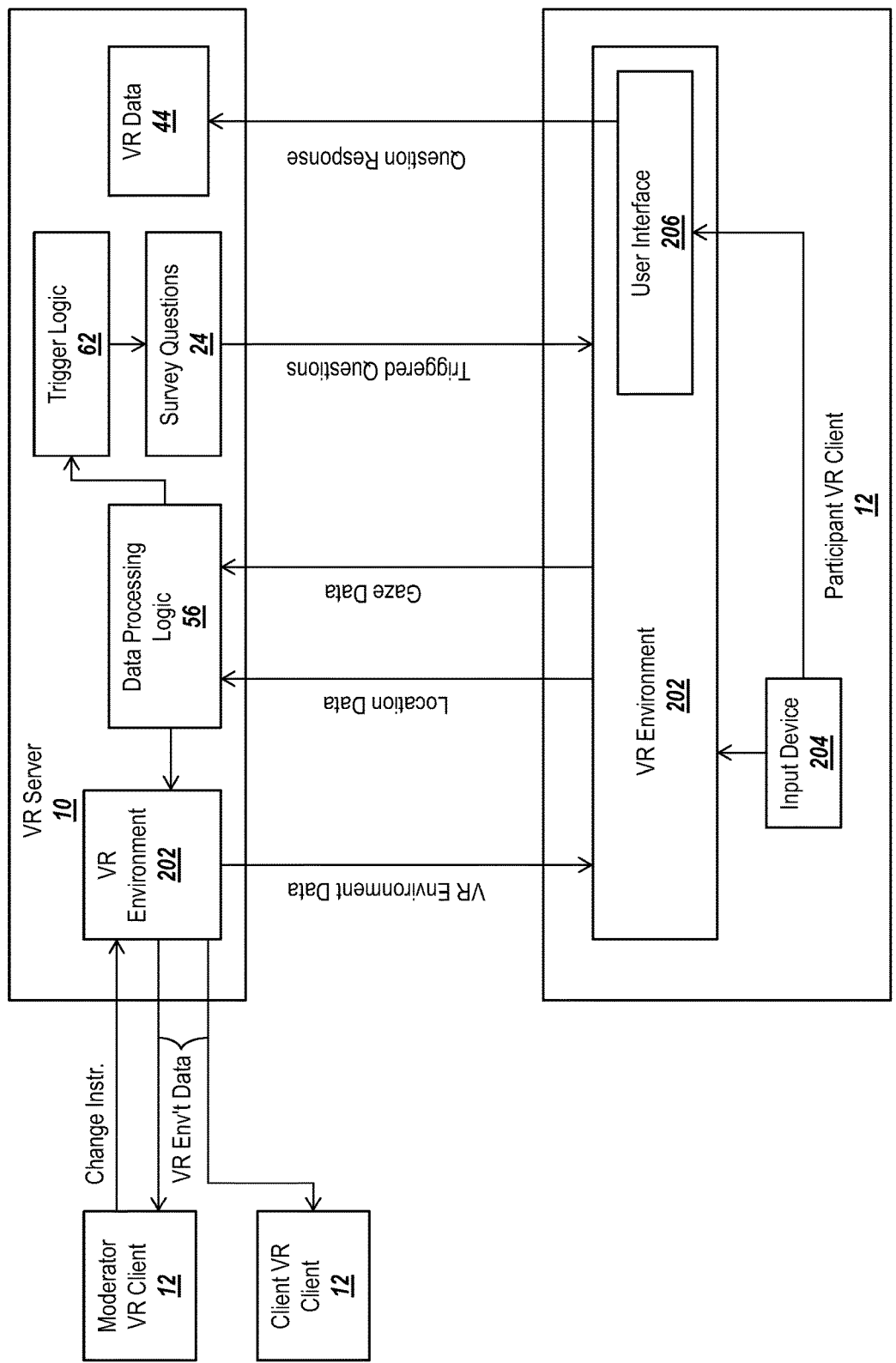
FIG. 10 is a data flow diagram showing exemplary information-routing paths for displaying and managing the simulated environment.

User-specific hardware may use the scene information generated in FIG. 9 to render the simulated environment and allow different users to interact with the simulated environment. FIG. 10 is a data flow diagram describing user interactions with the simulated environment.

The VR server 10 may host a copy of the simulated VR environment 202, or data associated with the VR environment 202 that allows each participant VR client 12 to generate their own copy of the simulated VR environment. In some embodiments, the VR server 10 may maintain information regarding the different users in the VR environment so that each user's avatar can be displayed to other users in the VR environment.

In some embodiments, the moderator interface may allow the moderator VR client to transmit a change instruction causing a change in the VR environment 202. For example, the change instruction may be an instruction to move a specified participant avatar to a specified location, to manually change the gaze direction of the participant, or to add new objects to the VR environment.

The VR server 10 may provide VR environment data to the VR clients 12 of participants, moderators, and clients, thereby allowing the VR clients 12 to render the VR environment 202. The VR clients 12 may be of homogeneous or heterogeneous types of hardware. Each type of user may interact with the VR server 10 through an appropriate type of interface 30, which may interpret instructions from the users differently according to the user's role.

If the user associated with a VR client 12 maintains an avatar in the VR environment 202, the VR client 12 may be provided with one or more input devices 204 allowing the user to interact with the VR environment 202. For example, the input devices 204 may include a joystick allowing the user to change the location of their avatar in the VR environment 202 and an accelerometer in a VR headset allowing the user's gaze location to be determined. Accordingly, each of the VR clients 12 associated with an avatar and/or viewer location (such as an invisible "camera" observing the VR environment 202) may transmit location data and gaze data to data processing logic 56 of the VR server 10.

The data processing logic may, in turn, provide the obtained information to trigger logic 62, which may determine if the user's avatar location or gaze location has triggered a survey question 24. If so, the triggered question may be provided to the VR environment 202 of the participant's VR client 12 and displayed on a user interface 206. In some embodiments, the survey question may be read aloud through a speaker in the participant VR client (and may be manually read by the moderator, or automatically played, e.g., through a previously-recorded sound file). The participant may use the input device(s) 204 to answer the survey questions, and the resulting question responses may be transmitted back to the VR serer 10 and stored in the VR data 44.

Figure 11:
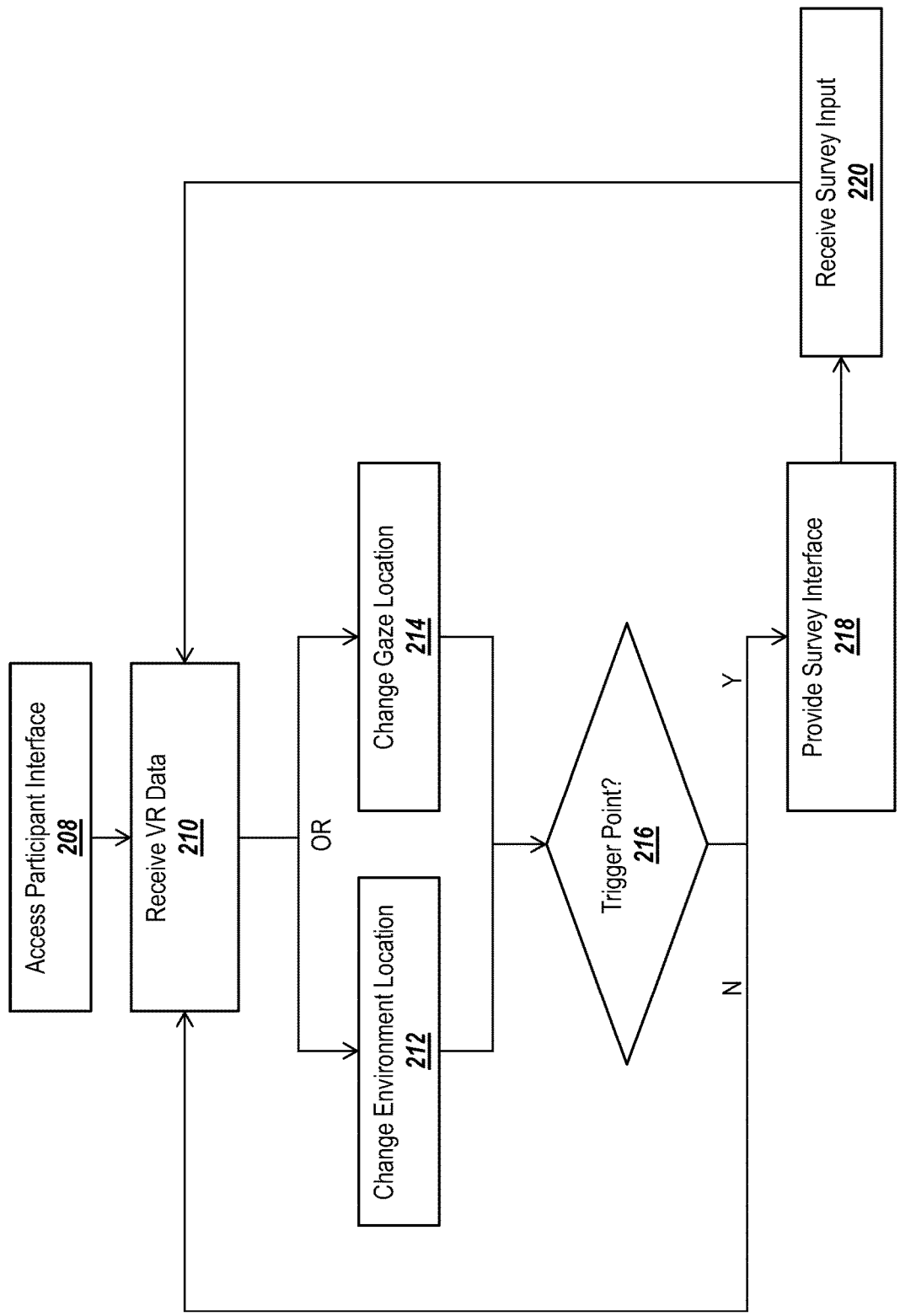
FIG. 11 is a flowchart describing an exemplary method for interacting with the simulated environment through a participant interface.

A flowchart of exemplary steps performed by the VR server 10 as the participant VR client 12 provides information about the participant's interaction with the VR environment 202 is depicted in FIG. 11.

At step 208, the VR server 10 may access a participant interface through which the participant VR client 12 provides data and information. At step 210, the VR server 10 may receive VR data through the participant interface, which may include (for example) an updated participant avatar location and an updated participant gaze location.

The VR server 10 may compare the updated location and gaze data to previous location and gaze data to determine whether the user's position or gaze has changed (and thus needs to be updated). If so, processing may proceed to either or both of steps 212 and 214, where the participant's view of the VR environment and/or position in the environment may be updated. If necessary, new environment view data may be transmitted to the participant VR client 12, and the view of the environment may be updated on the VR client 12. If the participant's environment location is changed at step 212 and other users are also represented in the VR environment 202 by avatars, the updated participant location information may be transmitted to the other users' VR clients 12 so that the participant's updated avatar location can be rendered in the other users' VR clients 12.

At step 216, it may be determined whether updating the participant's position or gaze location has caused the participant to activate a trigger point. If not, processing may return to step 210 where next VR data from the participant may be received. If a trigger point is activated, processing may proceed to step 218 where the user may be presented with a survey interface for answering the survey questions. Upon providing an input responsive to the survey question, processing the input may be transmitted to the VR server 10 and received at step 220. The answers to the survey questions may be stored with the VR data 44.

In addition to the answers to the survey questions, the VR data 44 may include individual and/or aggregated scores calculated based on participant's gaze locations. Exemplary score calculations are discussed below with respect to FIGS. 12 and 13.

Score Calculations

Figure 12:
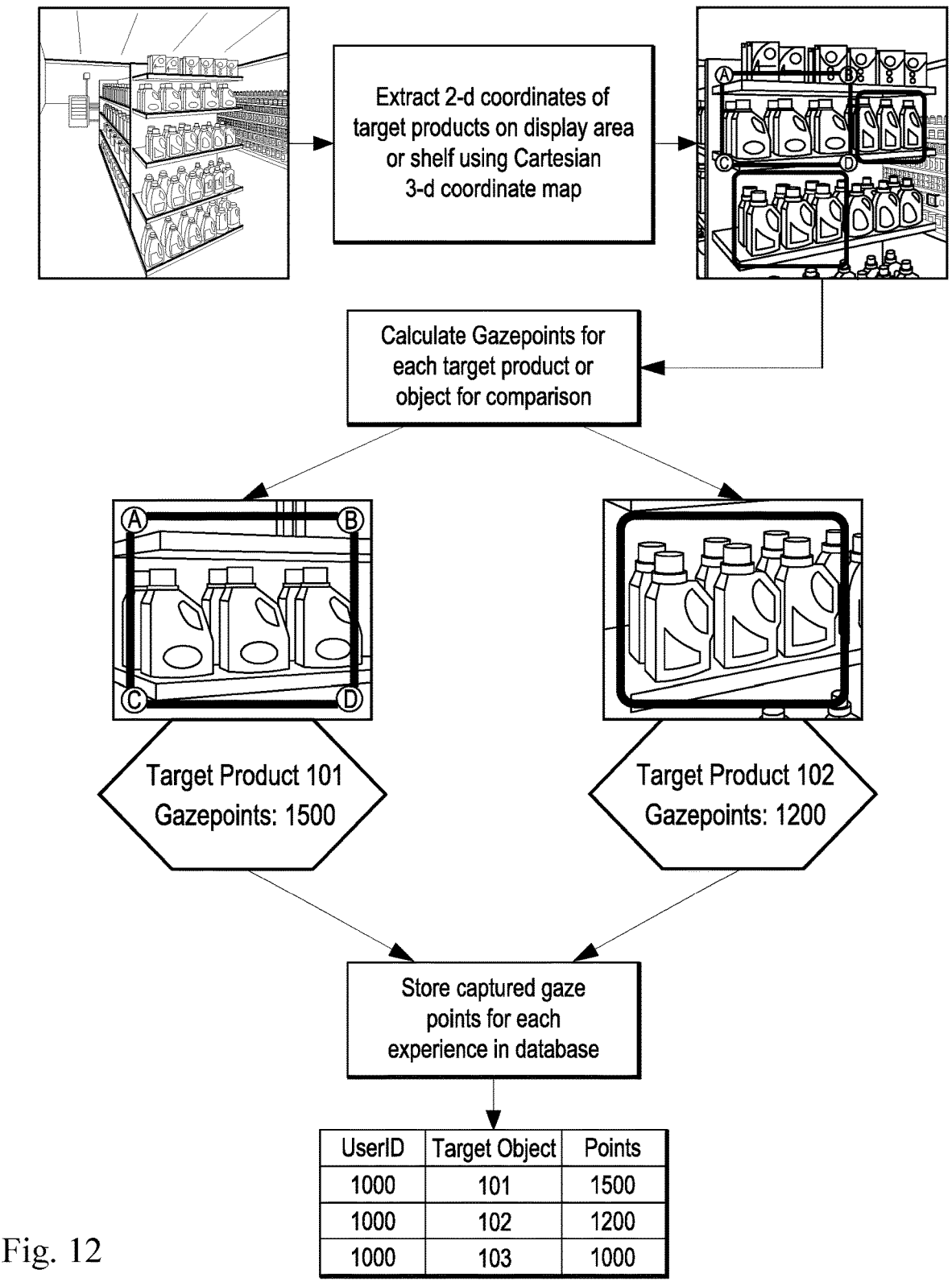
FIG. 12 describes an exemplary method for gathering and aggregating data from participants in the simulated environment.

As shown in FIG. 12, a participant may approach one or more environment objects representing different products on a display. The products may be placed in the simulated environment according to 3D coordinates associated with the associated environment objects. The VR server may extract 2D coordinates of the environment objects to identify a viewing plane representative of the areas of the participant's view in which the objects representative of a particular type of product is present. Different products may be associated with different sets of 2D coordinates.

Based on the 2D coordinates, a set of "gaze points" may be calculated for each type of product. The gaze points may represent an amount of attention (e.g., based on viewing time and the number of "second looks" given to the product). The participant's gaze may be represented as a single point (e.g., the center of the participants view), or may be represented as a series of gaze boxes. The boxes may be centered at the center of the participant's view, and may expand concentrically from that point. The more central gaze boxes may be assigned more gaze points on the assumption that the user is paying the most attention to the center of their view. Peripheral gaze boxes may be given decreasing number of gaze points on the assumption that the user is paying less attention, but nonetheless some attention, to the peripheral gaze boxes.

For example, a first gaze box may be represented as the central area of the participant's field of view (e.g., extending 10 degrees from the center of the participant's field of view). Any environment objects or products present in the first gaze box may accumulate, for example, 30 points per millisecond.

A second gaze box may extend 10-20 degrees from center. Any environment objects or products present in the second gaze box may accumulate, for example, 10 points per millisecond.

A third gaze box may extend 20-40 degrees from center. Any environment objects or products present in the third gaze box may accumulate, for example, 3 points per millisecond.

A fourth gaze box may extend 40-180 degrees from center and may accumulate gaze points at a rate of 1 per millisecond, while a fifth gaze box may include anything unseen and out of peripheral range, and may not accumulate any gaze points.

These values are intended to be exemplary, and one of ordinary skill in the art will recognize that other configurations or values may also be used.

The gaze score may be calculated in the manner above based on the first glance that the participant gives to a product. In some embodiments, the initial gaze score may be supplemented with additional accumulated gaze scores based on additional looks given to the product. In some embodiments, these second looks may be associated with a multiplier, on the assumption that a user directing their gaze away from the product and then returning to the product for a second look carries added significance.

Based on the raw gaze data, a formula may be used to calculate a gaze score. For example, one exemplary formula may be:

$$F=A+M*B$$

Where F is the final gaze score, A is the initial set of gaze points (described above), B is the number of second look points (calculated in the same manner as described above but only after the user has initially viewed a product and then moved their gaze away from the product), and M is a "second look multiplier," given as:

$$M=1+(T*0.1),$$

where T represents an amount of time spent away from the product (e.g., the time in second since the object entered gaze box 2, then completely left gaze box 4).

One of ordinary skill in the art will recognize that this formula is exemplary only, and may be modified based on the application. Further, the same logic may be extended to give different (e.g., increasing) scores based on a "third look," "fourth look," etc.

The gaze scores may be aggregated across multiple participants and/or stored separately for each participant. The gaze scores (individual or aggregate) may be represented visually in the simulated environment in the form of a gaze map. This may allow the moderator or client to quickly and easily determine which products have received the most attention.

Figure 13:
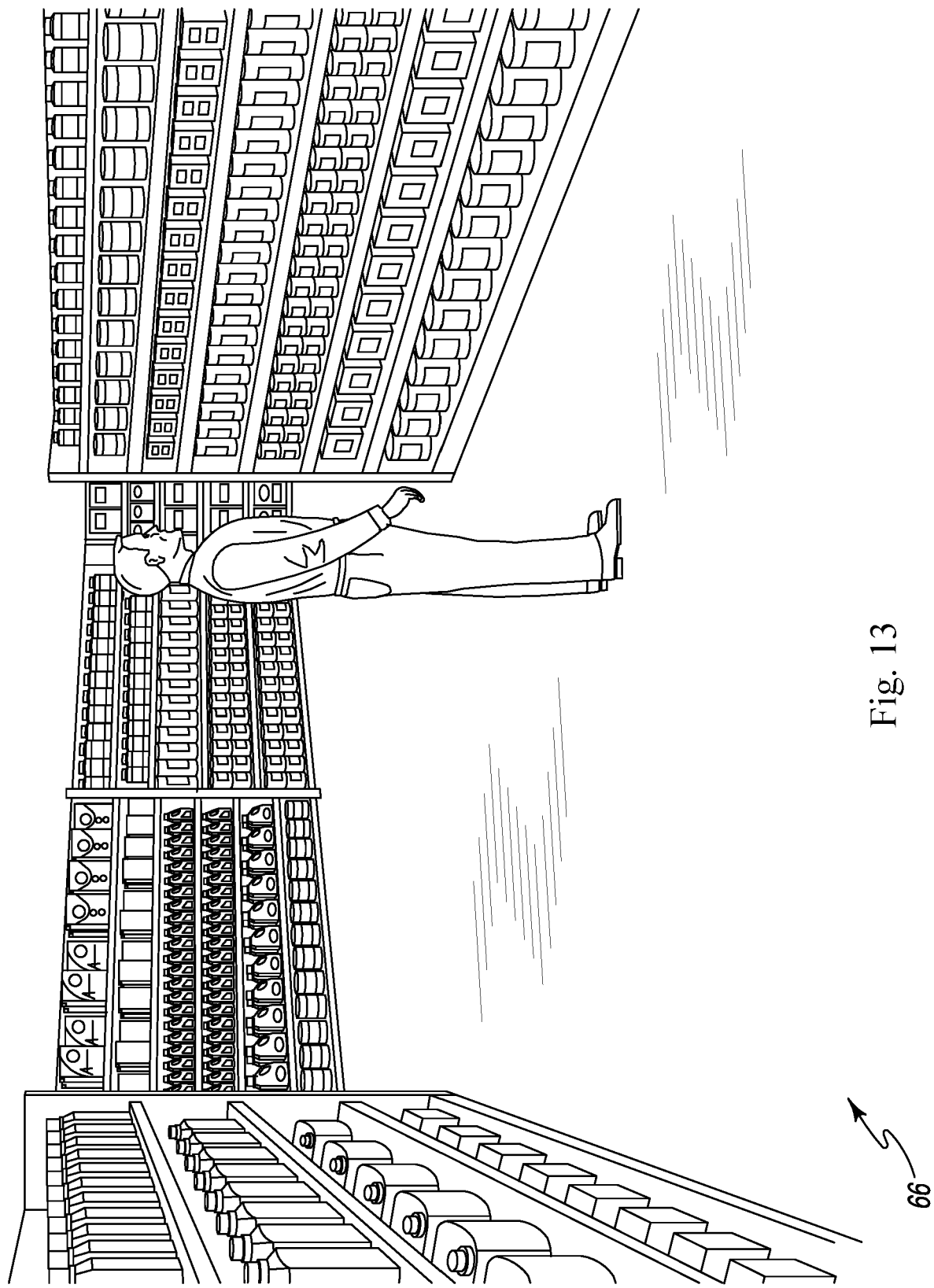
FIG. 13 depicts a map of aggregated data superimposed on the simulated environment.

An exemplary gaze map 222 is depicted in FIG. 13. Areas at which gaze points have been accumulated to a greater degree may be distinguished, for example using different colors or patterns, among other means of visually distinguishing different areas of attention.

An exemplary computing system or electronic device for implementing the above-described technologies is next described.

Computer-Implemented Embodiments

Some or all of the exemplary embodiments described herein may be embodied as a method performed in an electronic device having a processor that carries out the steps of the method. Furthermore, some or all of the exemplary embodiments described herein may be embodied as a system including a memory for storing instructions and a processor that is configured to execute the instructions in order to carry out the functionality described herein.

Still further, one or more of the acts described herein may be encoded as computer-executable instructions executable by processing logic. The computer-executable instructions may be stored on one or more non-transitory computer readable media. One or more of the above acts described herein may be performed in a suitably-programmed electronic device.

Figure 14:
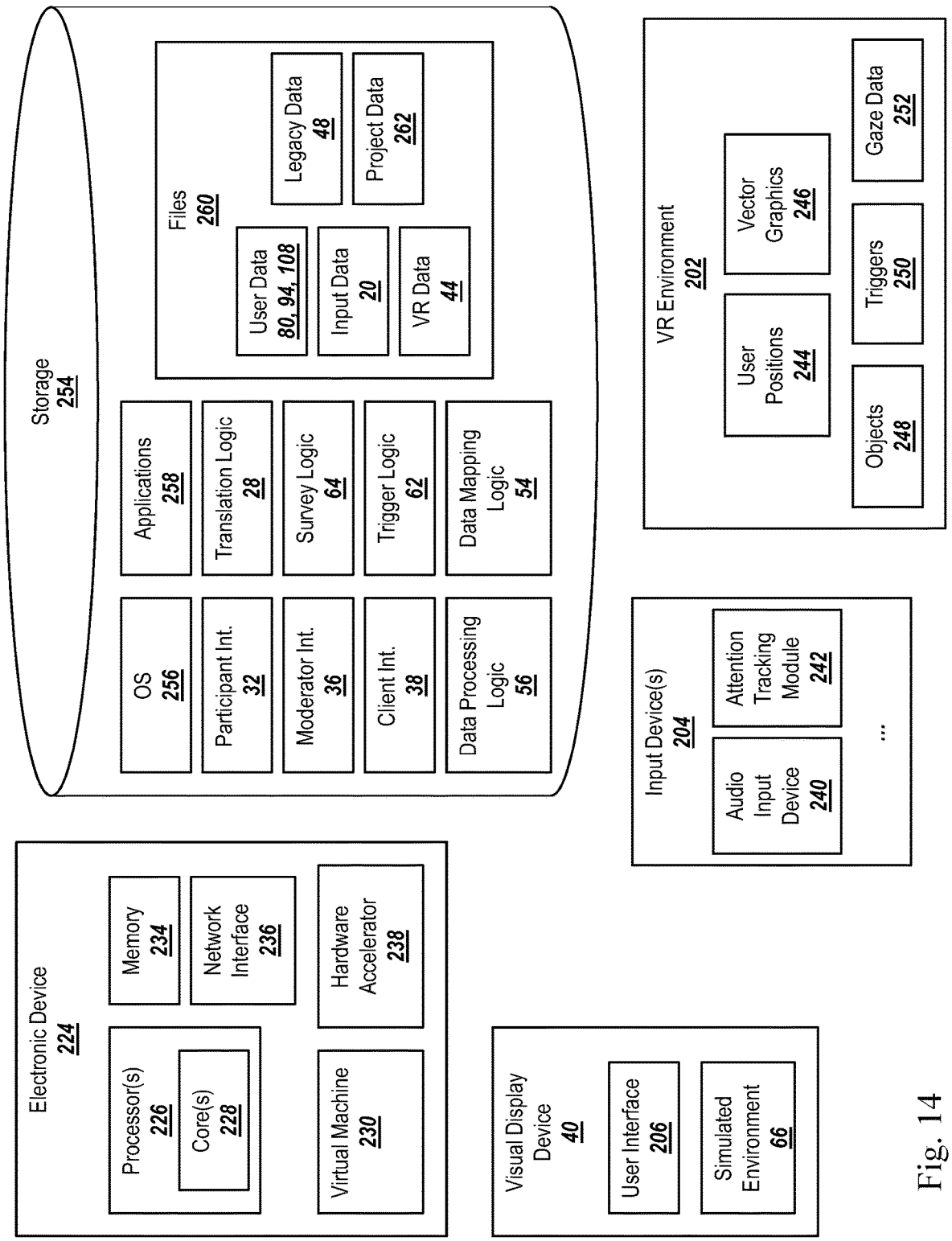
FIG. 14 depicts an exemplary electronic device suitable for use with exemplary embodiments.

An exemplary electronic device 224 is depicted in FIG. 14. The electronic device 224 may take many forms, including but not limited to a computer, workstation, server, network computer, quantum computer, optical computer, Internet appliance, mobile device, a pager, a tablet computer, a smart sensor, application specific processing device, etc.

The electronic device 224 described herein is illustrative and may take other forms. For example, an alternative implementation of the electronic device may have fewer components, more components, or components that are in a configuration that differs from the configuration described below. The components described below may be implemented using hardware based logic, software based logic and/or logic that is a combination of hardware and software based logic (e.g., hybrid logic); therefore, components described herein are not limited to a specific type of logic.

The electronic device 224 may include a processor 226. The processor 226 may include hardware based logic or a combination of hardware based logic and software to execute instructions on behalf of the electronic device 224. The processor 226 may include one or more cores 228 that execute instructions on behalf of the processor 226. The processor 2326 may include logic that may interpret, execute, and/or otherwise process information contained in, for example, a memory 234. The information may include computer-executable instructions and/or data that may implement one or more embodiments of the invention. The processor 226 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor 226 may include a single core or multiple cores. Moreover, the processor may include a system-on-chip (SoC) or system-in-package (SiP).

The electronic device 224 may include a memory 234, which may be embodied as one or more tangible non-transitory computer-readable storage media for storing one or more computer-executable instructions or software that may implement one or more embodiments of the invention. The memory 234 may comprise a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (FeRAM) devices, magneto-resistive RAM (MRAM) devices, phase change memory RAM (PRAM) devices, or other types of RAM devices.

The electronic device 224 may include a virtual machine (VM) 230 for executing the instructions loaded in the memory 234. A virtual machine 230 may be provided to handle a process running on multiple processors 226 so that the process may appear to be using only one computing resource rather than multiple computing resources. Virtualization may be employed in the electronic device 224 so that infrastructure and resources in the electronic device 224 may be shared dynamically. Multiple VMs 230 may be resident on a single electronic device 224.

A hardware accelerator 238 may be implemented in an ASIC, FPGA, or some other device. The hardware accelerator 238 may be used to reduce the general processing time of the electronic device 238.

The electronic device 224 may include a network interface 236 to interface to a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 802.11), high-speed interconnects (e.g., INFINIBAND, gigabit Ethernet, MYRINET) or some combination of any or all of the above. The network interface 236 may include a built-in network adapter, network interface card, personal computer memory card international association (PCMCIA) network card, card bus network adapter, wireless network adapter, universal serial bus (USB) network adapter, modem or any other device suitable for interfacing the electronic device to any type of network capable of communication and performing the operations described herein.

The electronic device 224 may include one or more input devices 204, such as a keyboard, a multi-point touch interface, a pointing device (e.g., a mouse), a joystick or gaming device, a gyroscope, an accelerometer, a haptic device, a tactile device, a neural device, a microphone, or a camera that may be used to receive input from, for example, a user. Note that electronic device 224 may include other suitable I/O peripherals.

Among other possibilities, the input devices 204 may include an audio input device 240, such as a microphone or array of microphones, and an attention tracking module 242. The attention tracking module 242 may be, for example, a device for directly tracking the user's attention (e.g., eye-tracking hardware that monitors the location to which the user's eyes are directed), a device for indirectly tracking the user's attention (e.g., a virtual reality headset that determines the location in which the user is looking based on accelerometer or compass data indicating the direction in which the user is pointing their head), and/or logic for imputing the user's attention based on the user's behavior (e.g., logic for interpreting a user's mouse clicks on a canvas or analyzing a survey response).

The input devices 204 may allow a user to provide input that is registered on a visual display device 40. The visual display device may be, for example, a virtual reality headset, a mobile device screen, or a PC or laptop screen. A simulated environment 66 may be displayed on the visual display device 40. Furthermore, a graphical user interface (GUI) 206 may be shown on the display device 40. The GUI 206 may display, for example, forms on which information, such as user information or survey questions, may be presented.

The input devices 204 and visual display device 40 may be used to interact with a virtual reality environment 202 hosted or supported by the electronic device 224. The virtual reality environment 202 may track user positions 244 (e.g., a location of user avatars within the virtual reality environment 202), provide vector graphics 246 for rendering objects and avatars in the environment, object data 248, trigger data 250, and gaze data 252 representing locations to which participants have directed their gaze.

A storage device 254 may also be associated with the electronic device 224. The storage device 254 may be accessible to the processor 226 via an I/O bus. Information stored in the storage 254 may be executed, interpreted, manipulated, and/or otherwise processed by the processor. The storage device 254 may include, for example, a magnetic disk, optical disk (e.g., CD-ROM, DVD player), random-access memory (RAM) disk, tape unit, and/or flash drive. The information may be stored on one or more non-transient tangible computer-readable media contained in the storage device. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments of the invention The storage device 254 may further store files 260, applications 258, and the electronic device 224 can be running an operating system (OS) 256. Examples of OSes may include the MICROSOFT® WINDOWS® operating systems, the UNIX and LINUX operating systems, the MACOS® for MACINTOSH computers, an embedded operating system, such as the Symbian OS, a real-time operating system, an open source operating system, a proprietary operating system, operating systems for mobile electronic devices, or other operating system capable of running on the electronic device 224 and performing the operations described herein. The operating system 256 may be running in native mode or emulated mode.

The files 260 may include files storing the user data 80, 94, 108 (see FIG. 4), input data 20 (such as hardware-agnostic canvases and survey questions), VR data 44 including translation mapping information 142 for different types of proprietary VR devices (see FIG. 7), legacy data 48, and project data 262 describing the current behavioral research project.

The storage device may further store the logic for implementing above-described participant interface 32, moderator interface 36, client interface 38, data processing logic 56, translation logic 28, survey logic 64, trigger logic 62, and data mapping logic 54, along with any other logic suitable for carrying out the procedures described in the present application.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

What is claimed is:

1. A system for monitoring behaviors of a participant during a virtual reality environment simulation, the system comprising:
  a non-transitory computer readable storage medium storing
    a hardware-agnostic canvas for a virtual reality environment, wherein the hardware-agnostic canvas comprises a database of objects in the virtual reality environment and coordinates for locating the objects at a location in the virtual reality environment, and trigger information relating to a threshold and a survey question that may be triggered, and
    translation logic for translating the hardware-agnostic canvas into a viewer-specific format;
  a viewer device configured to present the virtual reality environment to the participant; and
  a processor in communication with the storage medium, the processor being programmed to
    track a gaze location with an attention tracking module,
    as a function of the gaze location, calculate an attention score for one or more objects in the database of objects; and
    when the attention score exceeds the threshold, trigger presentation of the survey question.

2. The system of claim 1, wherein the calculation of the attention score for a particular object in the virtual reality environment is a function of the amount of time the gaze location matches the coordinates of the particular object.

3. The system of claim 1, wherein the calculation of the attention score for a particular object in the virtual reality environment is a function of the number of times the gaze location matches the coordinates of the particular object.

4. The system of claim 1, wherein the calculation of the attention score for a particular object in the virtual reality environment is a function of the distance between the gaze location and the coordinates of the particular object.

5. The system of claim 1, wherein the objects comprise:
  setting objects for defining the virtual reality environment and
  environment objects representing objects of interest in a study.

6. The system of claim 5, wherein the attention tracking module collects gaze data regarding an amount of time spent with the gaze location matching each of the environment objects.

7. The system of claim 6, wherein the translation logic translates the gaze data collected by the attention tracking module into a hardware-agnostic format.

8. The system of claim 1, wherein:
  the storage medium further stores translation mapping information, the translation mapping information comprising display information for a plurality of different types of viewer devices, and
  the translation logic accesses the translation mapping information to translate the hardware-agnostic canvas into the viewer-specific format suitable for the viewer device in real time during the virtual reality environment simulation.

9. The system of claim 1, wherein the hardware-agnostic canvas comprises vector image data for rendering an object of the hardware-agnostic canvas in the virtual reality environment.

10. A non-transitory computer-readable medium storing instructions that, when executed by a processor, cause the processor to:
  manipulate, in real time, a hardware-agnostic canvas for a virtual reality environment, wherein:
    the hardware-agnostic canvas comprises a database of objects to be placed in the virtual reality environment, and
    the database further comprises trigger information relating to a threshold and a survey question that may be triggered;
  apply translation logic to translate the hardware-agnostic canvas into a viewer-specific format,
  transmit virtual reality environment information in the viewer-specific format to a viewer;
  track a gaze location with an attention tracking module,
  as a function of the gaze location, calculate an attention score for one or more objects in the database of objects; and when the attention score exceeds the threshold, trigger presentation of the survey question.

11. The medium of claim 10, wherein the calculation of the attention score for a particular object in the virtual reality environment is a function of the amount of time the gaze location matches the coordinates of the particular object.

12. The medium of claim 10, wherein the calculation of the attention score for a particular object in the virtual reality environment is a function of the number of times the gaze location matches the coordinates of the particular object.

13. The medium of claim 10, wherein the calculation of the attention score for a particular object is a function of the distance between the gaze location and the coordinates of the particular object.

14. The medium of claim 10, wherein the instructions are further executable by the processor to:
  access translation mapping information, the translation mapping information comprising display information for a plurality of different types of viewers, and
  using the translation mapping information to translate the hardware-agnostic canvas into the viewer-specific format.

15. The medium of claim 14, wherein the hardware-agnostic canvas is translated into the viewer-specific format in real time as a viewer displays the virtual reality environment.

16. A method, comprising the steps of:
  accessing, using a processor of an electronic device, a hardware-agnostic canvas for a virtual reality environment, wherein the hardware-agnostic canvas comprises:
    a plurality of objects to be placed in the virtual reality environment,
    coordinates for locating the objects in the virtual reality environment,
    trigger information relating to a threshold, and
    a survey question that may be triggered;
  tracking a participant's gaze location with an attention tracking module;
  as a function of the gaze location, calculating an attention score in relation to a target object in the database of objects; and
  when the attention score exceeds the threshold, trigger presentation of the survey question.

17. The method of claim 16, wherein the tracking comprises:
  tracking the gaze location relative to the target object with:
    first eye-tracking hardware in a virtual reality headset;
    second eye-tracking hardware in the attention tracking module; and
  receiving data, at a server, based on data output by the first and second eye-tracking hardware, sufficient to determine the gaze location relative to the target object.

18. The method of claim 16, wherein the calculation of the attention score for a particular object in the virtual reality environment is a function of the amount of time the gaze location matches the coordinates of the particular object.

19. The method of claim 16, wherein the calculation of the attention score for a particular object in the virtual reality environment is a function of the number of times the gaze location matches the coordinates of the particular object.

20. The method of claim 16, wherein the calculation of the attention score for a particular object in the virtual reality environment is a function of the distance between the gaze location and the coordinates of the particular object.

* * * * *